(12) United States Patent
Watanabe et al.

(10) Patent No.: US 8,634,129 B2
(45) Date of Patent: Jan. 21, 2014

(54) WAVELENGTH SELECTIVE SWITCH

(75) Inventors: Satoshi Watanabe, Tokyo (JP); Koji Matsumoto, Hachioji (JP); Toshiro Okamura, Hino (JP); Takeshi Yamazaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/497,105

(22) PCT Filed: Jan. 30, 2012

(86) PCT No.: PCT/JP2012/000575
§ 371 (c)(1),
(2), (4) Date: Mar. 20, 2012

(87) PCT Pub. No.: WO2012/108139
PCT Pub. Date: Aug. 16, 2012

(65) Prior Publication Data
US 2013/0038917 A1    Feb. 14, 2013

(30) Foreign Application Priority Data

Feb. 10, 2011 (JP) ................................ 2011-027744
Nov. 28, 2011 (JP) ................................ 2011-259557

(51) Int. Cl.
*G02F 1/29* (2006.01)
*G02B 21/06* (2006.01)
*G02B 6/26* (2006.01)

(52) U.S. Cl.
USPC .............................. 359/318; 359/388; 385/18

(58) Field of Classification Search
None
See application file for complete search history.

(56) References Cited

U.S. PATENT DOCUMENTS 6,657,770 B2 * 12/2003 Marom et al. ................ 359/290
7,702,194 B2 *  4/2010 Presley et al. ................... 385/18
2008/0131119 A1 *  6/2008 Okada et al. ..................... 398/45

FOREIGN PATENT DOCUMENTS

JP    2008-310244    12/2008
JP    2010-134027    6/2010

* cited by examiner

*Primary Examiner* — Jade R Chwasz
(74) *Attorney, Agent, or Firm* — Scully, Scott, Murphy & Presser, P.C.

(57) ABSTRACT

Provided is a wavelength selective switch which includes: at least one input port; a dispersive portion for dispersing wavelength-multiplexed light input from the input port into wavelength-demultiplexed lights; a condenser element for condensing the wavelength-demultiplexed lights dispersed by the dispersive portion; a deflection portion having deflection elements for deflecting, for each wavelength-demultiplexed light condensed by the condenser element; at least one output port for outputting the wavelength-demultiplexed lights deflected by the deflection portion. A light-condensing position shift compensating element is disposed in an optical path between the input port and the dispersive portion or in the dispersive portion, for compensating light-condensing position shift of the wavelength-demultiplexed lights relative to the deflection element, light-condensing position shift being generated based on the arrangement of the input ports.

15 Claims, 36 Drawing Sheets

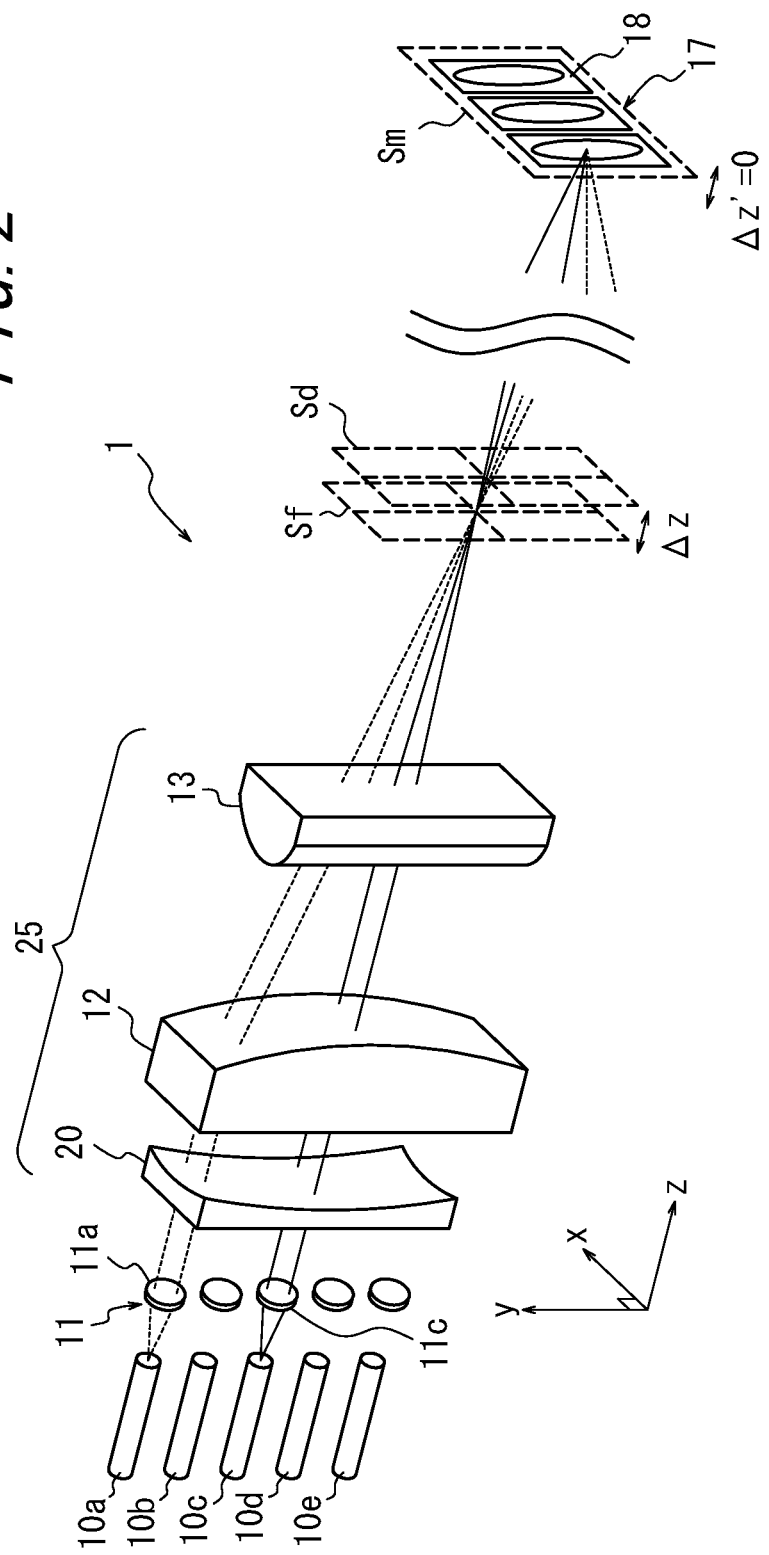

FIG. 8A
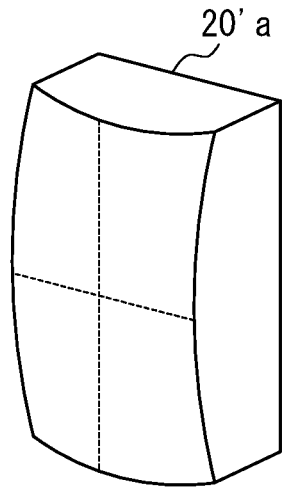
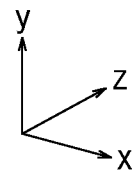
FIG. 8B
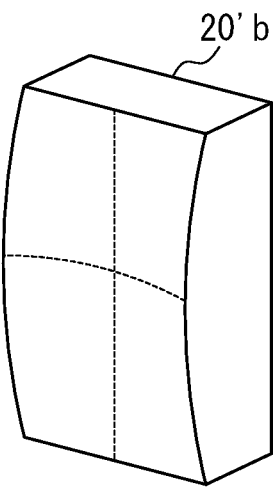
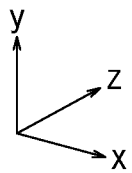

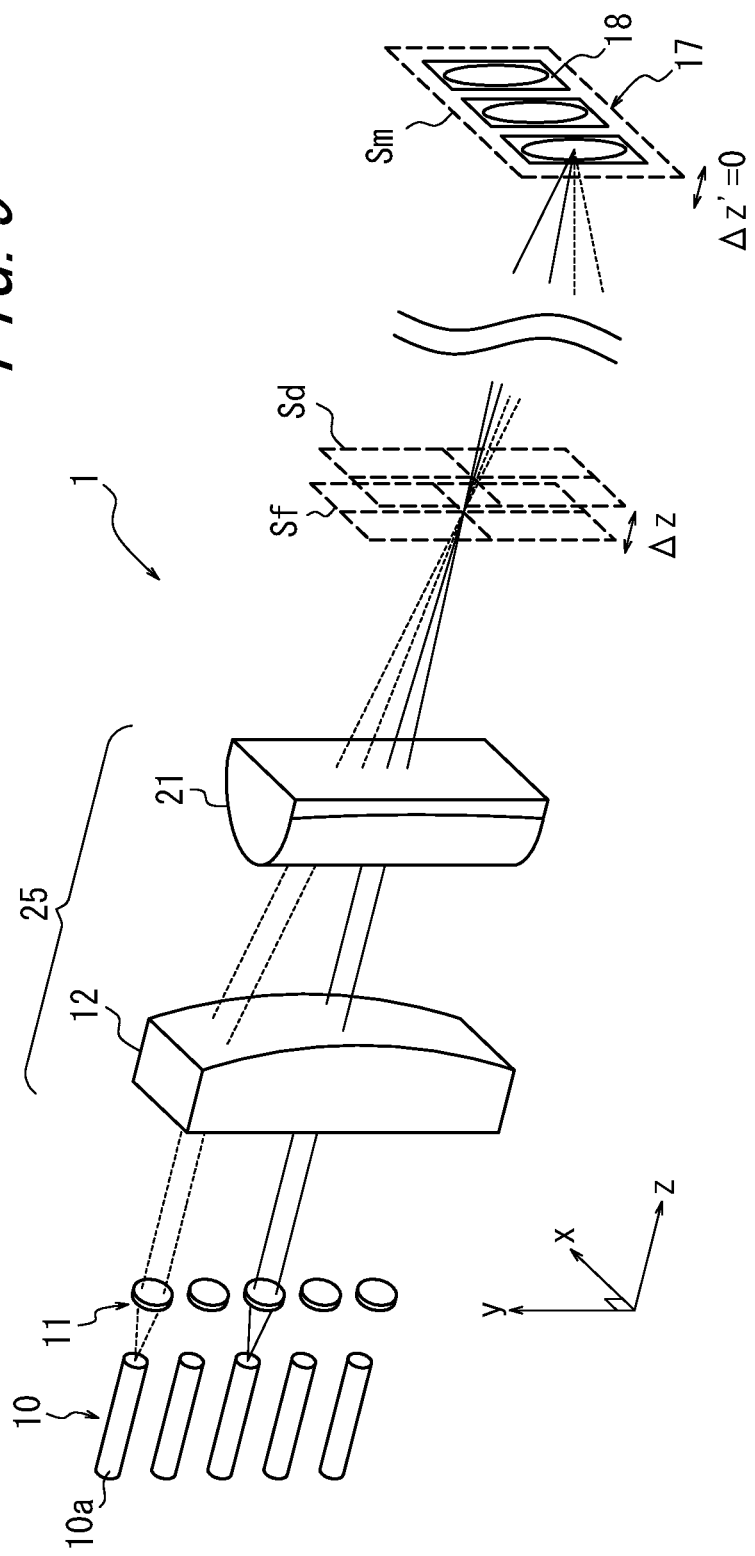

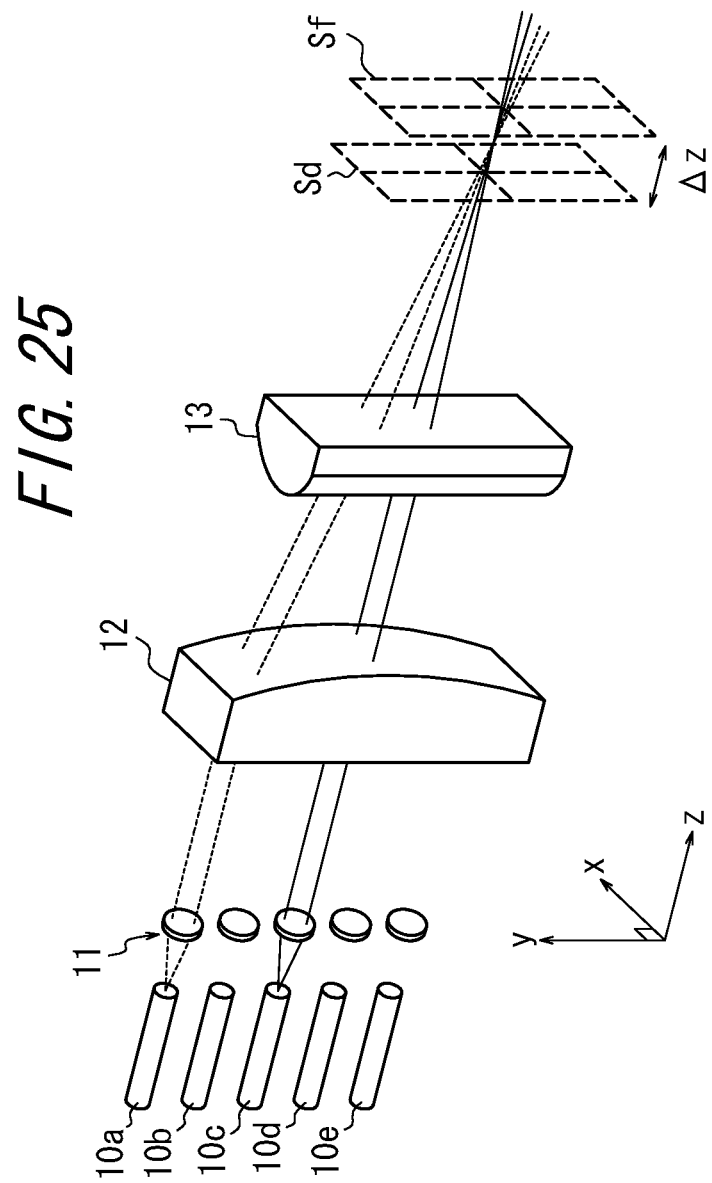

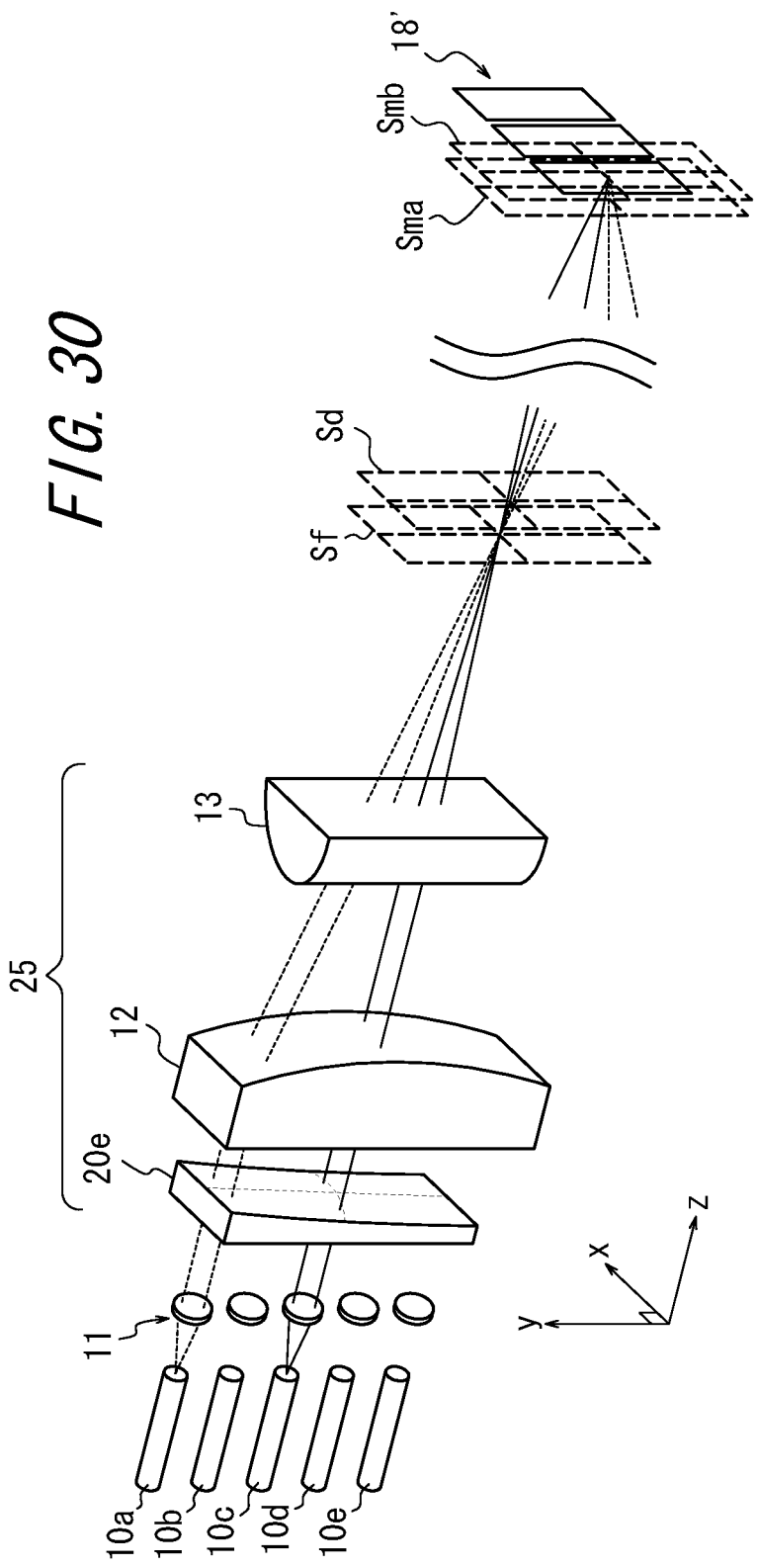

WAVELENGTH SELECTIVE SWITCH

CROSS REFERENCE TO RELATED APPLICATION

The present application claims priority from the prior Japanese Patent Application No. 2011-027744 filed on Feb. 10, 2011 and Japanese Patent Application No. 2011-259557 filed on Nov. 28, 2011; the entire contents of which are incorporated herein by reference.

TECHNICAL FIELD

The present invention relates to a wavelength selective switch capable of dispersing and coupling light of different wavelengths.

RELATED ART

Conventionally, there has been used, as a wavelength selective switch for use in wavelength division multiplexing, a device that includes at least one input port, at least one output port, a dispersive element, a condenser element, and a deflector, as described in JP 2010-134027 A and JP 2008-310244 A.

For example, according to the wavelength selective switch of JP 2010-134027 A, wavelength-multiplexed light input into the wavelength selective switch from one optical fiber in an optical fiber array (including input ports and output ports) is collimated into parallel beams by a micro lens array, dispersed into wavelengths by a diffraction grating (dispersive element), and condensed for each wavelength by a condenser lens onto different mirror elements (deflection elements) in the MEMS mirror array (deflection portion), so as to be deflected in different directions for each wavelength and outputted therefrom.

Further, according to the wavelength selective switch described in JP 2008-310244 A, wavelength-multiplexed light input from the input ports and the output ports that are arranged in an array is converged upstream of the diffraction grating using the lens and the cylindrical lens. The light is magnified after passing through the focal position, and then collimated into parallel light beams by a convex lens, so as to be incident on the diffraction grating (dispersive element). In this case, the cylindrical lens has an optical power in a direction perpendicular to the array direction of the input/output ports, and forms an elliptical spot on a mirror element in the MEMS mirror array serving as the deflection portion.

The wavelength selective switch is capable of dispersing wavelength-multiplexed light into wavelength-demultiplexed lights to output the lights from different output ports, and also capable of multiplexing the wavelength-demultiplexed lights through the control of the mirror elements, so as to output the light from the same output port.

DISCLOSURE OF THE INVENTION

Problems to be Solved by the Invention

The wavelength selective switch has input ports at different positions and output ports at different positions, through which light is input to and output from the wavelength selective switch, respectively. Typically, the input ports and the output ports have end surfaces for receiving incident light and outputting light, the end surfaces being arranged in series, to thereby allow light to be input to or output from the wavelength selective switch. Accordingly, light pass through the input ports and the output ports pass at different height positions for each the input ports and the output ports. Therefore, the distance from the optical axis to each port results in curvature of field in the vicinity of the deflection surface of the deflection element where the light is condensed. In other words, the light-condensing position is shifted along the optical axis depending on the position of the output/input port in the array direction. It is obvious that the shift of the light-condensing position becomes significantly large as the number of the input/output ports increases.

As described above, the light-condensing position shift in the vicinity of the deflection element leads to an increase in spot size of light on the deflection element surface such as a mirror as the deflection element. As a result, coupling efficiency of output/input light to the input/output port is degraded, leading to deterioration in communication quality. In particular, the deflection elements are arranged in series in the dispersion direction of the dispersive element, and hence beam broadening in the dispersion direction significantly deteriorates communication quality. Further, wider transmission band for each wavelength is strongly needed in order to multiplex faster modulated optical signals in a single optical fiber. For this reason, the light-condensing spot in the dispersion direction is required to be further reduced in width, with the result quality such as coupling efficiency becomes more susceptible to deterioration resulting from the light-condensing position shift.

The present invention has been made in view of the above-mentioned problems, and it is therefore an object of the invention to provide a wavelength selective switch capable of compensating the light-condensing position shift in the deflection portion to thereby improve communication quality.

Means for Solving the Problem

In order to attain the above-mentioned object, a wavelength selective switch according to a first aspect of the present invention includes:

at least one input port;

a dispersive portion for dispersing wavelength-multiplexed light input from the input port into wavelength-demultiplexed lights;

a condenser element for condensing the wavelength-demultiplexed lights dispersed by the dispersive portion;

a deflection portion having deflection elements for deflecting, for each wavelength-demultiplexed condensed by the condenser element;

at least one output port for outputting the wavelength-demultiplexed lights deflected by the deflection portion; and a light-condensing position shift compensating element which is disposed in an optical path between the input port and the dispersive portion or in the dispersive portion, and compensates light-condensing position shift of the wavelength-demultiplexed lights relative to the deflection element, light-condensing position shift being generated based on the arrangement of the input ports.

Here, the phrase "to compensate light-condensing position shift" means the compensation of light-condensing position so as to make the position conjugate to the emitting end surface of the input port, and does not necessarily mean that the light-condensing position is brought in line with the deflection element surface (mirror surface) of the deflection element.

Effect of the Invention

According to the present invention, a light-condensing position shift compensating element is used for compensating light-condensing position shift of wavelength-demultiplexed lights relative to the polarization plane of the deflection element, the position shift being caused based on the arrangement of the input ports, so as to compensate the light-condensing position shift at the deflection portion, to thereby improve communication quality.

BRIEF DESCRIPTION OF THE DRAWINGS

FIG. 2 is a perspective view showing beams traveling from the input/output ports to the vicinity of the light-condensing point and beams in the vicinity of the deflection mirror element of FIG. 1.

FIG. 8A is a perspective view illustrating an example of the light-condensing position shift compensating element of FIG. 7.

FIG. 8B is a perspective view illustrating another example of the light-condensing position shift compensating element of FIG. 7.

FIG. 9 is a perspective view illustrating a configuration of a wavelength selective switch according to a third embodiment of the present invention and beams passing therethrough.

FIG. 25 is a perspective view illustrating light beams traveling from the input/output ports to the vicinity of the primary light-condensing plane of FIGS. 21A and 21B.

FIG. 30 is a perspective view illustrating part of a configuration of a wavelength selective switch according to an eleventh embodiment of the present invention, and beams traveling from the input/output ports to the vicinity of the light-condensing point and beams in the vicinity of the deflection mirror element.

BEST MODES FOR CARRYING OUT THE INVENTION

In the following, embodiments according to a certain aspect of the present invention are described with reference to the drawings.

<First Embodiment>

Figure 1A:
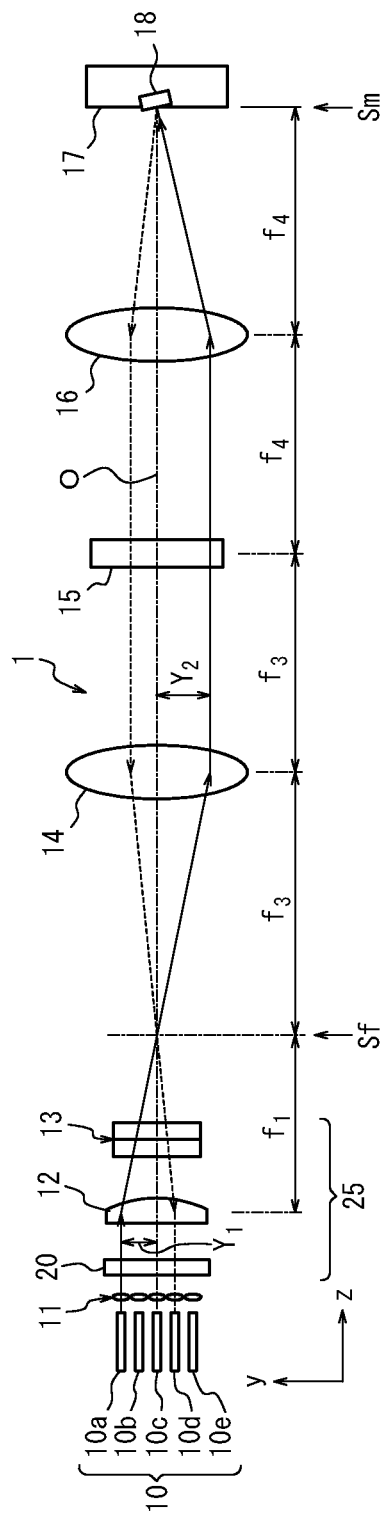
FIG. 1A is a side view illustrating a configuration of a wavelength selective switch according to a first embodiment of the present invention.
Figure 1B:
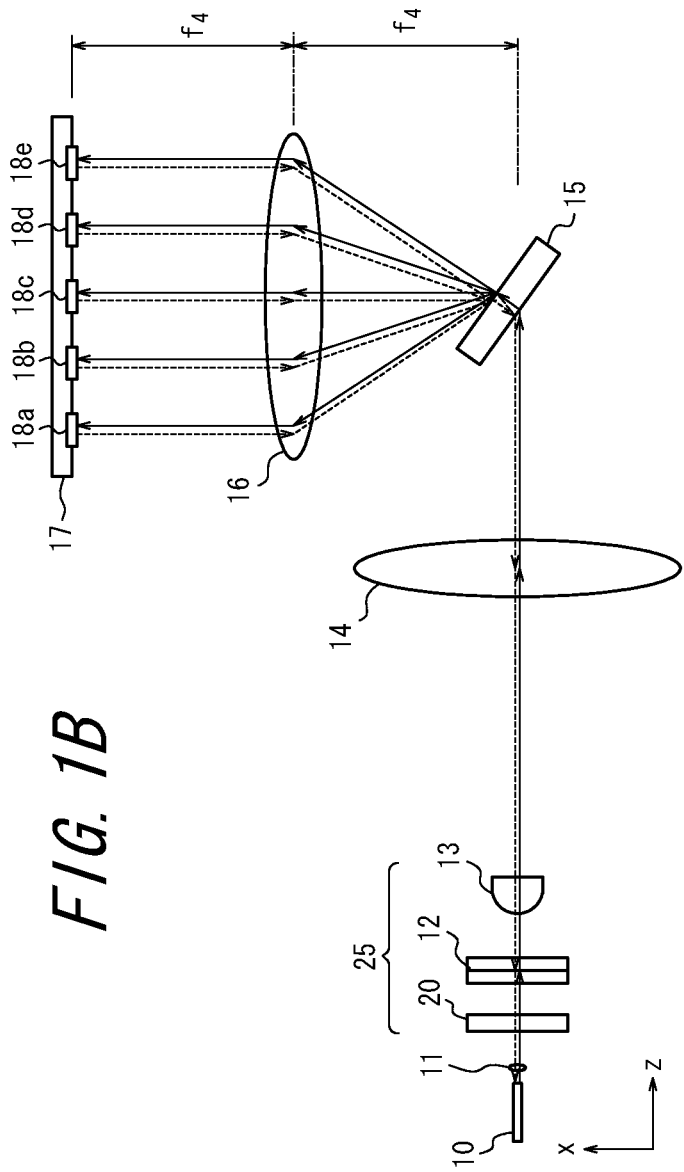
FIG. 1B is a top view illustrating a configuration of the wavelength selective switch according to the first embodiment of the present invention.

FIGS. 1A and 1B are a top view and a side view, respectively, each illustrating a configuration of a wavelength selective switch according to a first embodiment of the present invention.

The wavelength selective switch 1 is configured by including: an input/output portion 10, a micro lens array 11, a light-condensing position shift compensating element 20, a cylindrical lenses 12 and 13, a lens 14, a dispersive element (diffraction grating) 15 forming a dispersive portion, a lens (condenser lens) 16 forming a condenser element, and a deflector 17 forming a deflection portion. Here, the cylindrical lens 12 serves as first optical member, and the cylindrical lens 13 serves as second optical member.

In FIG. 1, the input/output portion 10 includes input ports 10a to 10c and 10e, and an output port 10d which are formed of optical fibers arranged in an array. Wavelength-multiplexed signal light is input from outside the wavelength selective switch 1 through the input ports 10a to 10c and 10e, and the signal light is output to the outside through the output port 10d. Hereinafter, for the sake of convenience in description, the input ports 10a to 10c and 10e, and the output port 10d are collectively referred to as input/output ports 10a to 10e as appropriate. One end of each of the optical fibers is arranged inside the wavelength selective switch 1, while the other end thereof is connected to the outside of the wavelength selective switch 1. The number of the input/output ports may be, for example, 10 or more, and further more number of the input/output ports may be provided. However, for the sake of description, FIG. 1A merely illustrates only five input/output ports 10a to 10e with the input/output port 10c in the center.

Further, the input/output ports 10a to 10e each form a pair with each of the micro lenses in the micro lens array 11. The micro lenses each convert light input from the input/output ports 10a to 10c, and 10e into parallel light beams, and couple the parallel light beams output to the input/output port 10d with the optical fiber. Further, light beams passing through the input/output ports 10a to 10c and 10e and the micro lenses to be input to the wavelength selective switch 1 and light beams passing through the input/output port 10d to be output from the wavelength selective switch 1 are parallel to each another.

Hereinafter, the travelling direction of the parallel light beams passing through the input/output ports 10a to 10e and the micro lens array 11 is defined as an optical axis direction (z direction, which corresponds to the horizontal direction in FIG. 1A). The optical axis direction also coincides with the optical axis direction of an optical system formed of the cylindrical lenses 12, 13 forming a compound lens, and the lens 14. Further, the input/output ports 10a to 10e and the micro lens array are arranged in a direction that is defined as a first direction (y direction corresponding to the vertical direction in FIG. 1A). The optical axis direction and the first direction are perpendicular to each other. Further, a direction perpendicular to each of the optical axis direction and the first direction (y direction) is referred to as second direction (x direction). It should be noted that, even if an actual wavelength selective switch has deflection members such as a mirror and a prism disposed in the optical path thereof so as to bend the optical path, the description on the x direction and the y direction is made assuming a virtual optical system that does not include such deflection members.

The light-condensing position shift compensating element 20 is a transmissive element that has an optical power only in the second direction (x direction). The optical power in the second direction (x direction) varies depending on the position in the first direction (y direction). The cylindrical lens 12 converges light beams in the first direction (y direction), that is, the lens has an optical power in the first direction (y direction). The cylindrical lens 12 has a focal length $f_1$ in the first direction (y direction). Further, the cylindrical lens (anamorphic lens) 13 converges light beams in the second direction (x direction), that is, the lens has an optical power only in the second direction (x direction). In the present application, the term "optical power" means a so-called optical power, and a positive optical power refers to a degree of deflecting parallel beams in a converging direction while a negative optical power refers to a degree of deflecting parallel light beams in a dispersing direction. In the present application, based on this definition, the term "optical power" is used not only for the transmissive optical element, but also for a reflective element and an element that involves diffraction.

The focal length and the arrangement of the cylindrical lens 13 are determined in such a manner that the light-condensing position of the cylindrical lens 13 in the second direction (x direction) coincides with the light-condensing position of the cylindrical lens 12 in the first direction (y direction). In other words, the cylindrical lens 13 has a focal length shorter than the focal length $f_1$ of the cylindrical lens 12. With this configuration, input light that has been converted by the micro lens array 11 into parallel light beams is substantially condensed on a primary light-condensing plane Sf by the light-condensing position shift compensating element 20, the cylindrical lens 12, and the cylindrical lens 13. The light-condensing position shift compensating element 20, the cylindrical lens 12, and the cylindrical lens 13 form a beam shaping optical system 25.

The lens 14 has a front light-condensing position that coincides with a light-condensing position of light input that has passed through the light-condensing position shift compensating element 20, the cylindrical lens 12, and the cylindrical lens 13. In other words, the lens 14 has a front light-condensing position located on the primary light-condensing plane Sf. Further, the optical system including the cylindrical lenses 12, 13, and the lens 14 are arranged so as to have an optical axis extending, for example, along the z direction to pass through the input-output port 10c. The dispersive element 15 is disposed in a position which makes the distance between the primary light-condensing plane Sf and the lens 14 and the distance between the lens 14 and a dispersion (diffraction) plane of the dispersive element 15 to be equal to each other and to coincide with a focal length $f_3$ of the lens 14. The dispersive element 15 is, for example, a diffraction grating of a parallel grating formed in the first direction (y direction) on a dispersion plane. The dispersive element may preferably have high capability to separate light into wavelength-demultiplexed lights and a large dispersion angle.

As illustrated in FIG. 1B, input light that has passed through the lens 14 is converted into substantially parallel light beams and incident on the dispersive element 15, so as to be diffracted at different angles for each wavelength in the x direction on the dispersion plane of the dispersive element 15. That is, the dispersive element 15 separates the input light into wavelength-demultiplexed lights, for each wavelength included in the input light. For simplicity, FIG. 1A linearly illustrates the optical path in the z direction from the input/output portion 10 leading to the deflector 17.

Further, the lens 16 and the deflector 17 are arranged so that the distance from the dispersion plane of the dispersive element 15 to the lens 16 and the distance from the lens 16 to the deflection element surface (mirror surface) of each of the deflection elements 18 of the deflector 17 each coincide with a focal length $f_4$ of the lens 16. With this configuration, as illustrated in FIG. 1B, light beams dispersed into wavelength-demultiplexed lights by the dispersive element 15 pass through the lens 16 to be converted into converged light beams parallel to one another, and incident substantially vertically on deflection elements 18a to 18e corresponding to the respective wavelengths. Further, as illustrated in FIG. 1A, input light that has passed through the light-condensing point on the primary light-condensing plane Sf is dispersed by the dispersive element 15, and then condensed at a position at a height (position in the y direction) where the optical axis of the lens 16 and the deflection element surface of each of the deflection elements 18 intersect with each other. This means that input light input from any of the input/output ports 10a to 10c, and 10e is also condensed on one of the deflection elements 18 (any of 18a to 18c depending on the wavelength) at the same height position.

The deflector 17 is, for example, a MEMS mirror array, and the deflection elements 18 are micro mirrors forming the MEMS mirror array. The deflection elements 18 are arranged in parallel at the height position of the optical axis of the above-mentioned lens 16 according to the wavelengths into which light is to be separated. The mirrors serving as the deflection elements 18 may be controlled independently of one another to be changed in tilt. In particular, the deflection elements 18 may be changed in tilt in the yz plane of FIG. 1A, to thereby reflect the incident wavelength-demultiplexed lights, in a direction of height different from the incident direction. As illustrated in FIG. 1B, when seen from the y direction, the wavelength-demultiplexed lights are vertically incident on the deflection elements 18a to 18e and vertically reflected therefrom. The tilt of the micro mirrors may not necessarily be controlled merely within the yz plane. For example, the micro mirrors may be tilted relative to a turning axis perpendicular to the turning axis of each of the mirrors tilting relative to the yz plane. When the mirrors are tilted in this way, light of a wavelength incident on the micro mirror is reflected at an angle different from the incident direction of the light when seen from the y direction, so as to suppress crosstalk from an input port to an output port adjacent to each other, to thereby perform arbitrary optical attenuation. Further, the number of the deflection elements 18 illustrated in FIG. 1B is five. However, the number of the deflection elements 18 is not limited to five.

The wavelength-demultiplexed lights reflected by the deflective elements 18a to 18e each pass through the lens 16 to be diffracted by the dispersive element 15, and travel along an optical path in a direction opposite to the input light, so as to be output to the input/output port 10d, which is other than the input/output ports used for input, of the input/output portions 10.

It may be designed as appropriate as to which of the input/output ports 10a to 10e to be used as an input port or an output port. Specifically, only the input/output port 10a may be used as an input port, while the rest of the input/output ports may be used as output ports. Alternatively, a plurality of input ports and a plurality of output ports may be provided. FIGS. 1A and 1B each illustrate a case where the input/output ports 10a to 10c and 10e serve as input ports, while the input/output port 10d serves as output port, in which wavelength-multiplexed input light is input from the input/output port 10a and output light of a specific wavelength is output from the input/output port 10d.

In FIG. 1A, the input/output port 10a is disposed in a position at a distance $Y_1$ to the optical axis of the optical system formed of the cylindrical lenses 12, 13 and the lens 14. As illustrated by the solid line in FIG. 1A, input light from the input/output port 10a passes through the beam shaping optical system 25 to be condensed on the primary light-condensing plane Sf, and then passes through the lens 14 so as to be converted into parallel light beams at a distance $Y_2$ from the optical axis, which are dispersed into wavelength-demultiplexed lights by the dispersive element 15 to pass through the lens 16, so as to be condensed for each wavelength on the deflection elements 18a to 18e.

Here, in order to output, from the input/output port 10d, light of at least one of the wavelengths of light that has been input to the deflection elements 18a to 18e, the deflection direction of the corresponding one of the deflection elements 18 is controlled so as to reflect light of a specific wavelength in a predetermined direction as illustrated by the broken line in FIG. 1A. The light of a specific wavelength reflected by any of the deflection elements 18 passes through the lens 16, and is output from the input/output port 10d via the dispersive element 15, the lens 14, the beam shaping optical system 25, and a corresponding micro lens in the micro lens array 11. When outputting a plurality of light beams of different wavelengths from the same output/input port 10d, the plurality of light beams of different wavelengths are multiplexed by the dispersive element 15.

Figure 3A:
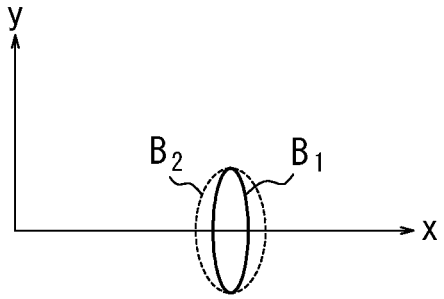
FIG. 3A illustrates a beam spot formed on the primary light-condensing plane Sf of FIG. 2.
Figure 3B:
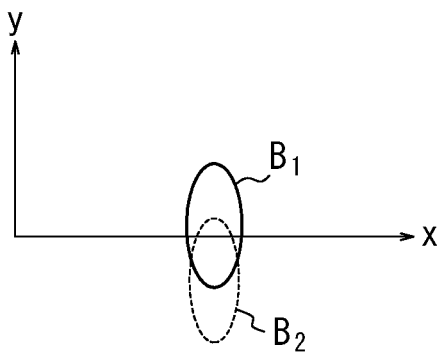
FIG. 3B illustrates a beam spot formed on the dummy plane Sd of FIG. 2.

Next, description is given of a function of the beam shaping optical system 25, with reference to FIGS. 2 and 3. FIG. 2 is a perspective view showing beams traveling from the input/output ports 10a to 10e to the vicinity of the light-condensing point and beams in the vicinity of the deflection element 18 of FIG. 1. FIGS. 3A, 3B, and 3B each illustrate a beam shape on the primary light-condensing plane Sf, on a dummy plane Sd to be described later, and on the deflection element surface Sm, respectively. In these drawings, the input/output port 10*a* and the input/output port 10*c* are both used as input ports.

First, in this embodiment, the cylindrical lens 12 having an optical power in the first direction (y direction) and the cylindrical lens 13 having an optical power in the second direction (x direction) are arranged at different positions on the optical path, with the cylindrical lens 13 having a larger optical power. In other words, this optical system has a larger numerical aperture in the second direction (x direction). Accordingly, input light from the input/output port 10*c* forms an elliptic shape $B_1$ on the primary light-condensing plane Sf, as illustrated by the solid line in FIG. 3A. This elliptical spot is imaged as an elliptical spot $B_1$, as illustrated by the solid line in FIG. 3C, on the deflection element surface Sm which is made conjugate to the primary light-condensing plane Sf by the lenses 14 and 16. This spot is formed of light that has been dispersed into wavelength-demultiplexed lights by the dispersive element 15, so that a plurality of spots are aligned in parallel in the horizontal direction as the direction of wavelength separation. Here, in order to increase the number of wavelengths to be switched in the wavelength selective switch 1, it is necessary to reduce the frequency interval of wavelength-demultiplexed lights for each wavelength included in the input light. In particular, in the 50 GHz spacing, in which the occupied wavelength bandwidth becomes narrower, it is necessary to employ the deflection element 18 that is narrower in the direction of wavelength separation, so that light may be condensed by the deflection element 18 to a spot that is smaller in width. The beam shaping optical system 25 may be used, as in this embodiment, so as to shape the beam spot shape into an elliptic shape having a short axis in the dispersion direction of the dispersive element 15, to thereby increase the wavelength resolution, so as to prevent crosstalk, which is otherwise generated by light beams of different wavelengths entering the same deflection element 18.

Further, the light-condensing position shift compensating element 20 is provided in order to compensate for curvature of field which is generated when the beam shaping optical system 25 is formed of the cylindrical lenses 12 and 13. Without the light-condensing position shift compensating element 20, input light emitted from the input/output port 10*a*, which is at a large distance from the optical axis of the optical system including the cylindrical lenses 12, 13 and the lens 14, is condensed in front of the deflection element surface Sm. In particular, the spot broadening in the x direction on the deflection element surface Sm of FIG. 2 deteriorates the communication quality of the wavelength selective switch 1. In view of this, the light-condensing position shift compensating element 20 is provided for compensating the input light emitted from the input/output port 10*a* so that the light forms a spot $B_2$ that has a smallest width in the x direction on the deflection element surface Sm as illustrated by the broken line of FIG. 3C.

Figure 3C:
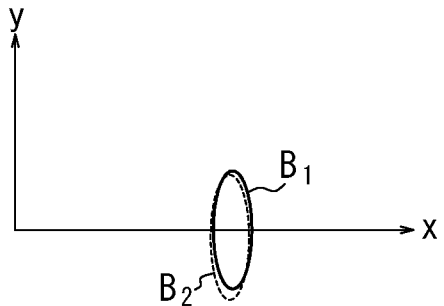
FIG. 3C illustrates a beam spot formed on the deflection element surface Sm of FIG. 2.

When the light-condensing position shift compensating element 20 is used, the spot $B_2$ formed on the primary light-condensing plane Sf by the input light from the input/output port 10*a* is not smallest in width as illustrated by the broken line in FIG. 3A, whereas the spot becomes smallest in width as illustrated in FIG. 3B on the lens 14 side. The dummy plane Sd is a plane perpendicular to the optical axis including a position where the input light from the input/output port 10*a* becomes smallest in width, which is illustrated in FIG. 2B. In other words, the light-condensing position shift compensating element 20 adjusts the amount of shift Δz between the primary light-condensing plane Sf and the dummy plane Sd, to thereby reduce to zero the amount of shift Δz' of the light-condensing position on the deflection element surface Sm. In FIGS. 3A to 3C, each spot is schematically illustrated, and the size thereof is not limited. Further, the positional relation between the primary light-condensing plane Sf and the dummy plane Sd is design example, and the dummy plane Sd is not necessarily disposed closer to the lens 14 side than the primary light-condensing plane Sf.

Figure 4A:
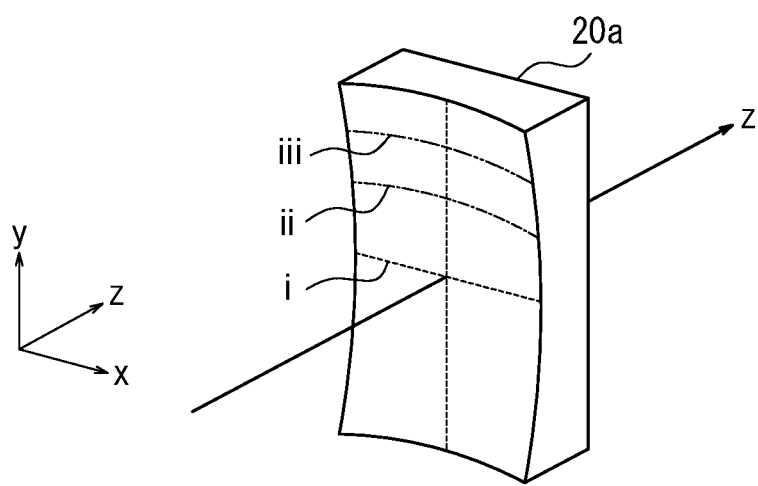
FIG. 4A is a perspective view of an example of the light-condensing position shift compensating element of FIG. 1.
Figure 4B:
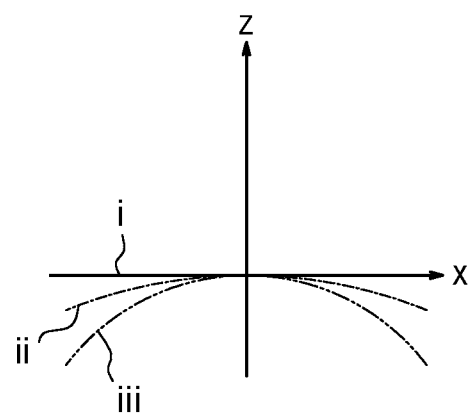
FIG. 4B is a view for illustrating a shape of the refracting interface of the light-condensing position shift compensating element of FIG. 4A.

FIG. 4A is a perspective view of an example of the light-condensing position shift compensating element 20 of FIG. 1. FIG. 4B is a view for illustrating a shape of the refracting interface of the light-condensing position shift compensating element 20*a* of FIG. 4A. The light-condensing position shift compensating element 20*a* is formed of an optically-transparent member such as glass. In FIG. 4A, the front side is formed as a curved surface having an optical power, while the back side thereof is formed as a planar surface. The light-condensing position shift compensating element 20*a* has a refracting interface having sectional shapes i, ii, and iii at different positions in the y direction, which are taken along planes parallel to the xz plane. As illustrated in FIGS. 4A and 4B, the light-condensing position shift compensating element 20*a* has substantially no optical power in the first direction (y direction). Further, the light-condensing position shift compensating element 20*a* has different optical powers in the second direction (x direction), depending on the position in the first direction (y direction). More specifically, the light-condensing position shift compensating element 20*a* has zero optical power in the second direction (x direction) at the center position in the first direction (y direction), and has a negative optical power in the second direction (x direction) which increases as the distance from the center position in the first direction (y direction). With this configuration, the light-condensing position of light beams passing through a position away in the first direction (y direction) from the optical axis is shifted in a direction toward the lens 14. The center position in the first direction (y direction) corresponds to a position where the optical axes of the compound lens formed of the cylindrical lenses 12, 13, and the lens 14 pass through.

Figure 5A:
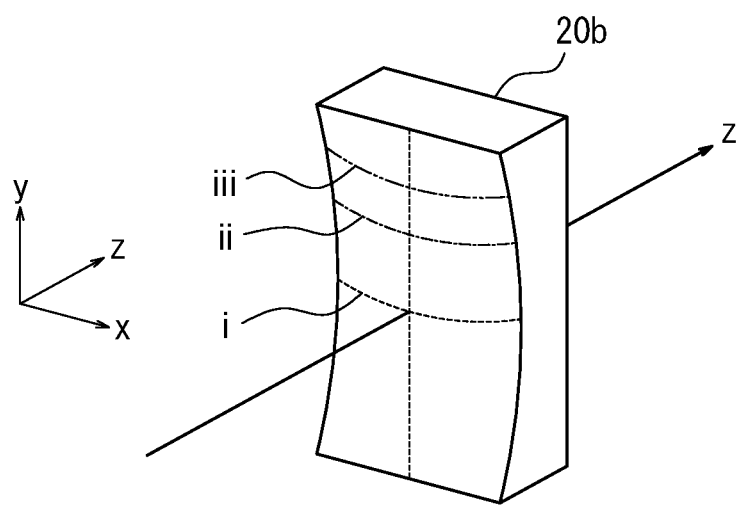
FIG. 5A is a perspective view of another example of the light-condensing position shift compensating element of FIG. 1.
Figure 5B:
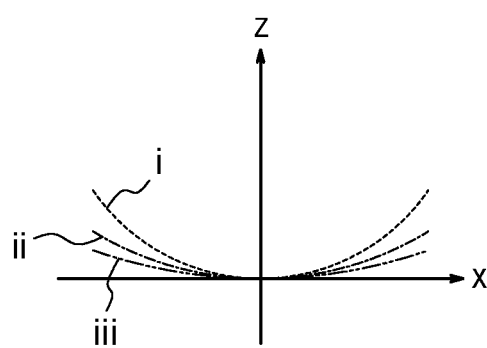
FIG. 5B is a view for illustrating a shape of the refracting interface of the light-condensing position shift compensating element of FIG. 5A.

Alternatively, the light-condensing position shift compensating element 20 may employ another element in a different shape. FIG. 5A is a perspective view of another example of the light-condensing position shift compensating element 20 of FIG. 1. FIG. 5B is a view for illustrating a shape of the refracting interface of the light-condensing position shift compensating element 20*b* of FIG. 5A. The light-condensing position shift compensating element 20*b* has a positive optical power in the second direction (x direction) at the center position in the first direction (y direction), and the optical power in the second direction (x direction) decreases with the distance from the center position in the first direction (y direction). When the light-condensing position shift compensating element 20*b* is used, input light which is input from the input/output port 10*c* and travels along the optical axis is also subjected to optical power in the second direction (x direction). Therefore, the cylindrical lens 13 is also adjusted in focal length and/or position, so as to have a light-condensing position in the second direction (x direction) on the primary light-condensing plane Sf.

Figure 6A:
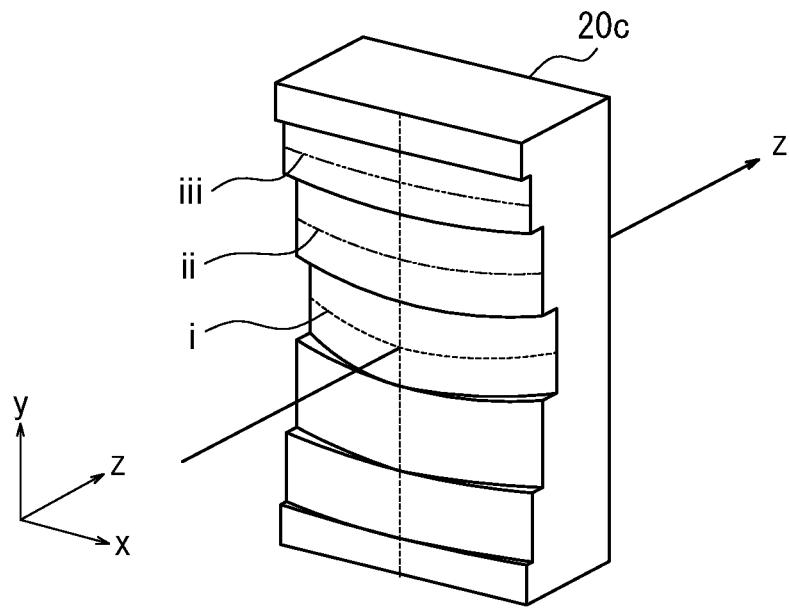
FIG. 6A is a perspective view of further another example of the light-condensing position shift compensating element of FIG. 1.
Figure 6B:
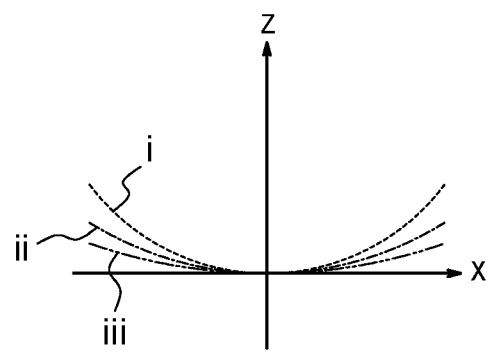
FIG. 6B is a view for illustrating a shape of the refracting interface of the light-condensing position shift compensating element of FIG. 6A.

FIG. 6A is a perspective view of further another example of the light-condensing position shift compensating element 20 of FIG. 1. FIG. 6B is a view for illustrating a shape of the refracting interface of the light-condensing position shift compensating element 20*c* of FIG. 6A. The light-condensing position shift compensating element 20*c* may be used in place of the light-condensing position shift compensating element 20*b* of FIGS. 5A and 5B. The light-condensing position shift compensating element 20*b* of FIGS. 5A and 5B has a refracting interface formed of a curved surface having a smoothly-changing curvature, whereas the light-condensing position shift compensating element 20c has a refracting interface formed of a combination of cylindrical surfaces that are different in curvature in the second direction (x direction), in accordance with the incident positions of input light from the respective input/output ports 10a to 10c and 10e in the first direction (y direction). Here, the respective cylindrical surfaces are arranged in such a manner that the refracting interface in the yz plane including the z axis draws a straight line. In other portions, there are differences in level across the boundary between the respective cylindrical refracting interfaces corresponding to the input/output ports 10a to 10e that are different from one another. With the use of the light-condensing position shift compensating element 20c configured as described above, input light beams of light input from the respective input/output ports 10a to 10c and 10e are all subjected to uniform optical power in the second direction (x direction). Further, the refracting interface in the yz plane including the z axis may not draw a straight line. For example, concentric cylinders may be stacked to form the cylindrical refracting interfaces corresponding to the input/output ports 10a to 10e that are different from each other. Even in this case, input light beams of light input from the respective input/output ports 10a to 10c and 10e are all subjected to uniform optical power in the second direction (x direction).

As described above, according to this embodiment, there is provided the light-condensing position shift compensating element 20 for condensing input light input from each the input/output ports 10a to 10c and 10e to form an elliptical spot that is smallest in width on the deflection element surface of each of the deflection elements 18, regardless of which of the input/output ports 10a to 10c and 10e has been used to input the light, to thereby make it possible to condense, with high accuracy, light that has been dispersed into wavelength-demultiplexed lights by the dispersive element 15 on the deflection element surface of the deflection element 18, regardless of the positions of the input/output ports 10a to 10c and 10e from which the light has been input. This can therefore prevent crosstalk, which is otherwise generated by light beams of different wavelengths entering the same deflection element, and degradation in optical coupling efficiency to the output port, to thereby improve communication quality. Further, the wavelength resolution for each channel is increased, so as to be applicable to a wider transmission band required for increasing the speed of optical communications. Even when the output port 10d is used as an input port, the compensating element 20 may preferably be configured so as to allow input light input from the input/output port 10d to be condensed with high accuracy on the deflection element surface of the deflection element 18.

Further, the light-condensing position shift compensating element 20 is disposed in the beam shaping optical system 25 which condensed input light from the input/output ports 10a to 10c and 10e once on the primary light-condensing plane Sf, to thereby make the configuration compact.

<Second Embodiment>

Figure 7:
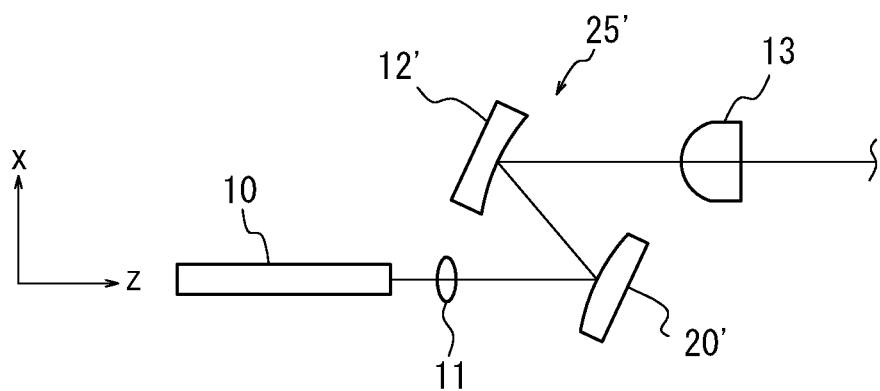
FIG. 7 is a top view illustrating part of a configuration of a wavelength selective switch according to a second embodiment of the present invention.

FIG. 7 is a top view illustrating part of a configuration of a wavelength selective switch 1 according to a second embodiment of the present invention. This embodiment includes a beam shaping optical system 25' of FIG. 7 in place of the beam shaping optical system 25 of the first embodiment, and also includes, similarly to the first embodiment, the lens 14, the dispersive element 15, the lens 16, and the deflector 17 including the deflection elements 18, which are arranged downstream of the cylindrical lens 13. The beam shaping optical system 25' of this optical system includes a reflective light-condensing position shift compensating element 20' having an optical power only in the second direction (x direction), a spherical mirror 12', and the cylindrical lens 13 having an optical power only in the second direction (x direction). Here, the spherical mirror 12' serves as first optical member, and the cylindrical lens 13 serves as second optical member.

FIG. 8A is a perspective view illustrating an example of the light-condensing position shift compensating element 20' of FIG. 7. In FIG. 8A, a reflecting surface is on the front side. The light-condensing position shift compensating element 20'a has substantially no optical power in the first direction (y direction). Further, the light-condensing position shift compensating element 20'a has different optical powers in the second direction (x direction) depending on the position in the first direction (y direction). More specifically, the light-condensing position shift compensating element 20'a has zero optical power in the second direction (x direction) at the center position in the first direction (y direction), and has a negative optical power in the second direction (x direction) which increases as the distance from the center position in the first direction (y direction). With this configuration, the light-condensing position of light beams passing through a position away in the first direction (y direction) from the optical axis is shifted in a direction toward the lens 14.

FIG. 8B is a perspective view illustrating another example of the light-condensing position shift compensating element 20' of FIG. 7. The light-condensing position shift compensating element 20'b has substantially no optical power in the first direction (y direction). Further, the light-condensing position shift compensating element 20'b has a positive optical power in the second direction (x direction) at the center position in the first direction (y direction), and the optical power in the second direction (x direction) decreases as the distance from the center position in the first direction (y direction). With the use of the light-condensing position shift compensating element 20'b, input light passing through the optical axis after being input from the input/output port 10c is also subjected to optical power in the second direction (x direction). Therefore, the cylindrical lens 13 is adjusted in focal length and/or position, so that the light-condensing position in the second direction (x direction) falls on the primary light-condensing plane Sf. Other configurations and effects are similar to those of the first embodiment.

As described above, according to this embodiment, a reflective element can be used as the light-condensing position shift compensating element 20'. Therefore, a transmissive or a reflective light-condensing position shift compensating element may be selectively used as appropriate, depending on the requirements in spatial configuration of the optical system of the wavelength selective switch 1 and the frequency characteristic of the light to be used. The spherical mirror 12' may be a cylindrical mirror having an optical power only in the first direction (y direction).

Even when the output port 10d is used as an input port, the light-condensing position shift compensating element 20 may preferably be configured so as to allow input light input from the input/output port 10d to be condensed with high accuracy on the deflection element surface of the deflection element 18.

<Third Embodiment>

FIG. 9 is a perspective view illustrating a configuration of a wavelength selective switch 1 according to a third embodiment of the present invention and beams passing therethrough. The wavelength selective switch 1 includes a single light-condensing position shift compensating element 21 in place of the light-condensing position shift compensating element 20 and the cylindrical lens 13 of the wavelength selective switch 1 according to the first embodiment. In other words, the light-condensing position shift compensating element 21 has a function of condensing light in the second direction (x direction) and a function of compensating shift of the light-condensing position in the second direction (x direction) according to the position in the first direction (y direction).

Figure 10A:
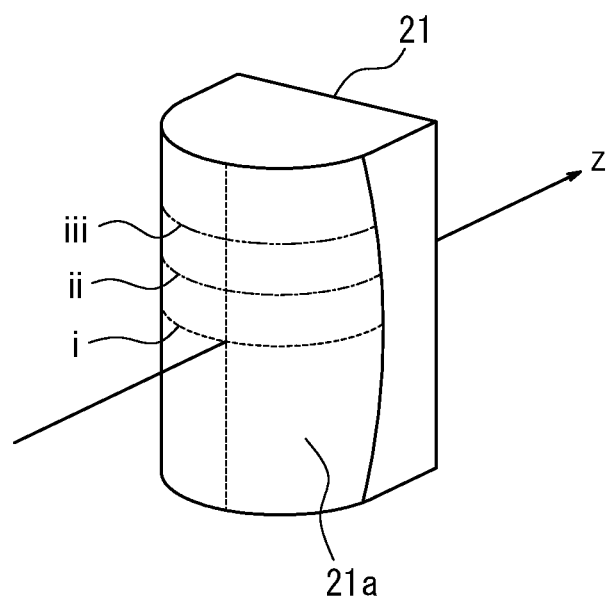
FIG. 10A is a perspective view illustrating an example of the light-condensing position shift compensating element of FIG. 9.
Figure 10B:
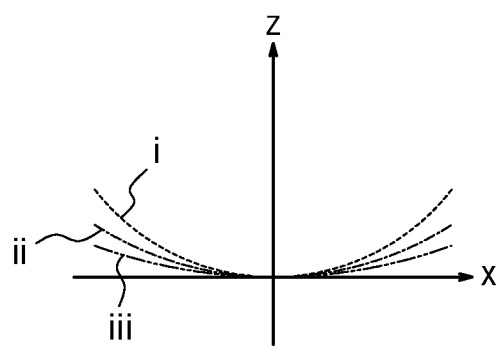
FIG. 10B is a graph for illustrating a shape of the refracting interface of the light-condensing position shift compensating element of FIG. 10A.

FIG. 10A is a perspective view illustrating an example of the light-condensing position shift compensating element 21 of FIG. 9. FIG. 10B is a graph for illustrating the shape of the refracting interface of the light-condensing position shift compensating element 21 of FIG. 10A. The light-condensing position shift compensating element 21 is formed to have a curved surface 21a with an optical power on the front side of FIG. 10A and a planar surface on the back side thereof. The light-condensing position shift compensating element 21 has a refracting interface having sectional shapes i, ii, and iii at different positions in the y direction, which are taken along planes parallel to the xz plane. As illustrated in FIGS. 10A and 10B, the refracting interface of the light-condensing position shift compensating element 21 is formed of a modified cylindrical surface. Specifically, the light-condensing position shift compensating element 21 has substantially no optical power in the first direction (y direction). Further, the curvature at the center in the first direction (y direction) of the light-condensing position shift compensating element 21 is defined so as to provide an optical power in the second direction (x direction) for condensing input light in the optical axis direction on the primary light-condensing plane Sf. The optical power in the second direction (x direction) decreases as the distance from the center position in the first direction (y direction). With this configuration, the light-condensing position of light beams passing through a position away in the second direction (x direction) from the optical axis is shifted in a direction toward the lens 14. As a result, when light is input from the input/output ports 10a and 10c, the primary light-condensing plane Sf, the dummy plane Sd, and the deflection element surface Sm have light spots formed in shapes similar to those illustrated in FIGS. 3A, 3B, and 3C, respectively.

Figure 11:
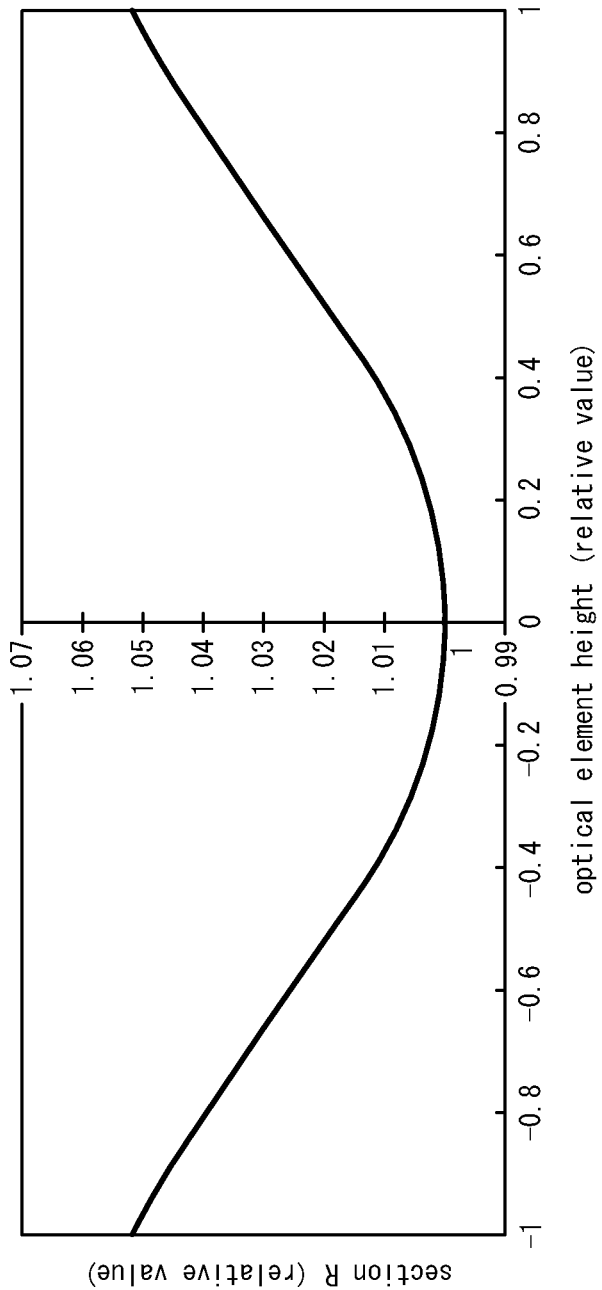
FIG. 11 is a graph showing a design example of the light-condensing position shift compensating element of FIG. 9.

FIG. 11 is a graph showing a design example of the light-condensing position shift compensating element 21 of FIG. 9. The graph has the abscissa showing the height position in the light-condensing position shift compensating element 21, that is, the position in the first direction, in which 0 represents the same height as the optical axis, and 1 and −1 represent the uppermost part and the lowermost part, respectively. The ordinate shows the curvature radius R of the refracting interface in section vertical to the first direction (y direction), namely, the xz section in relative value with respect to a value defined as 1 which is obtained when the optical element has a height position of 0. FIG. 11 shows that the curvature radius R increases as the height position of the optical element is distanced away from the center.

Figure 12:
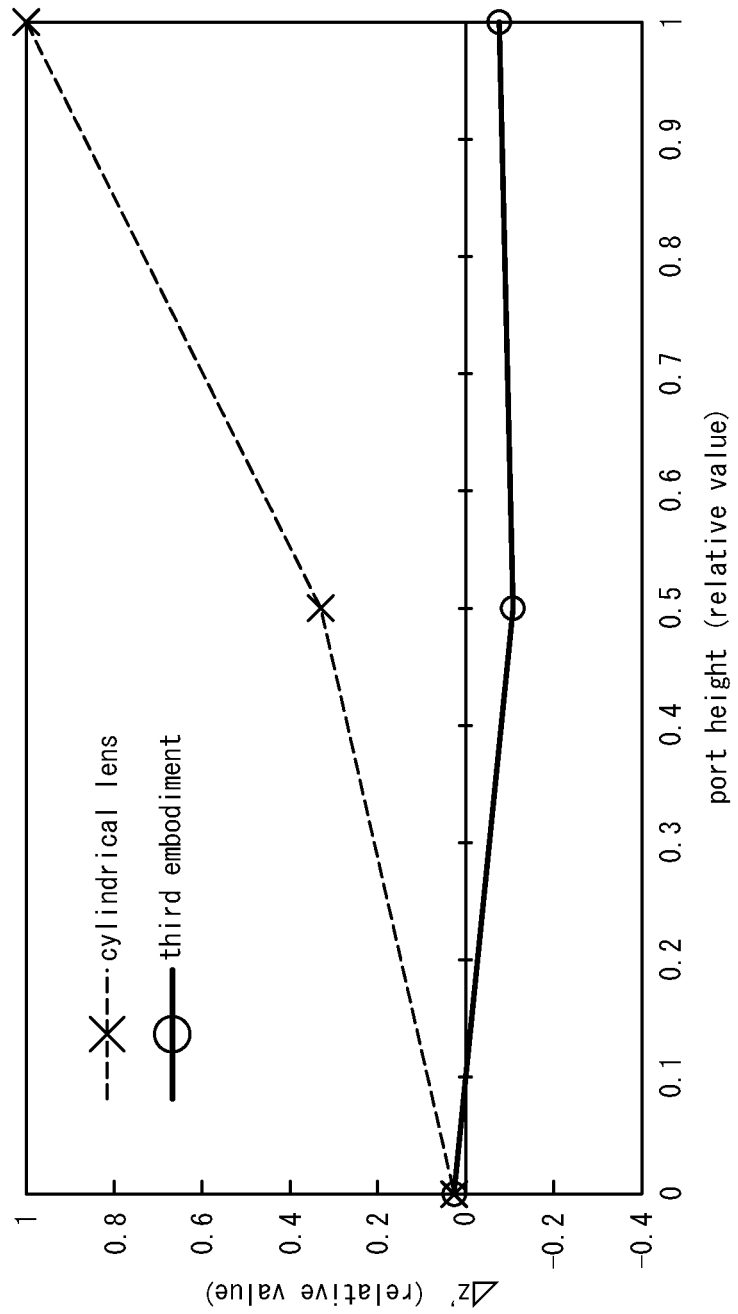
FIG. 12 is a graph showing simulation results on the light-condensing position shift on the deflection element surface with respect to the port height of the input/output ports.

FIG. 12 is a graph showing simulation results on the light-condensing position shift Δz' on the deflection element surface Sm with respect to the port height of the input/output ports, which are obtained with the use of the light-condensing position shift compensating element 21 designed based on the design example of the optical device shown in FIG. 11. The broken line in the graph shows the light-condensing position shift obtained with the use of a cylindrical lens that does not have a function of compensating the light-condensing position shift, instead of using the light-condensing position shift compensating element 21. The graph shows Δz' on the ordinate in relative value with respect to the value of 1, which is a maximum value of the light-shifting position shift Δz' obtained for the cylindrical lens. FIG. 12 shows that the use of the light-condensing position shift compensating element 21 makes it possible to suppress the light-condensing position shift Δz' to 1/10 or less irrespective of the port height of the input/output ports, as compared to the case of using a cylindrical lens that does not have a function of compensating the light-condensing position shift.

Other configurations are similar to those of the first embodiment. Accordingly, the same constituent elements are denoted by the same reference symbols, and the description thereof is omitted.

As described above, according to this embodiment, with the beam shaping optical system 25 being formed of two optical elements, namely, the cylindrical lens 12 and the light-condensing position shift compensating element 21, the light-condensing position shift can still be compensated, to thereby obtain the same effect as in the first embodiment. Therefore, the number of components remains the same as in the case of not compensating the light-condensing position shift in the second direction (x direction). Further, the light-condensing position shift compensating element of this embodiment can be manufactured by modifying the process of manufacturing a conventional cylindrical lens, which is easier than manufacturing a new member for use as the light-condensing position shift compensating element. In addition, as compared to the case where the light-condensing position shift compensating element is separately provided as in the first embodiment, it is easy to make adjustments to the optical system. The light-condensing position shift compensating element 21 may processed by the following methods including a method of directly manufacturing a lens shape through NC processing, a method of manufacturing a mold and shaping the lens using the mold, and a method that involves the use of lithography technology. When manufacturing the lens through molding, optical glass or a resin suited for the molding may be selected as appropriate. Alternatively, the light-condensing position shift compensating element 21 may be formed as a reflective element.

<Fourth Embodiment>

Figure 13:
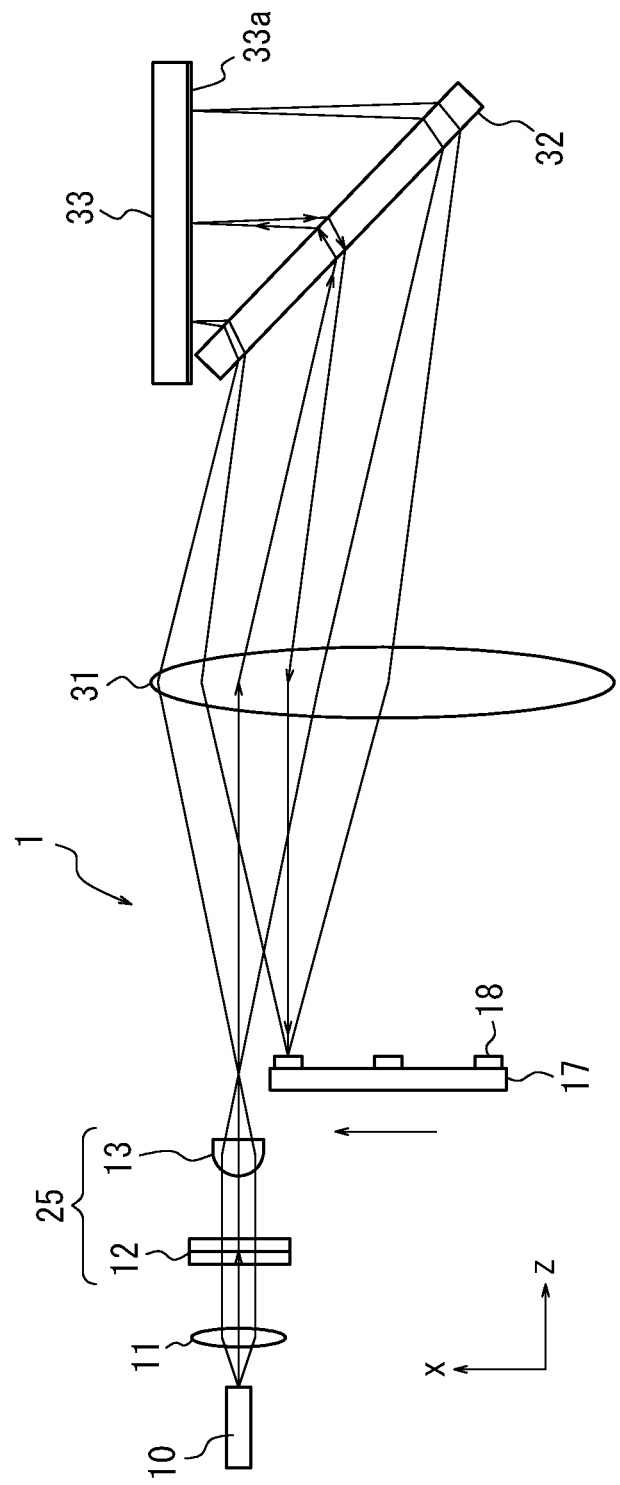
FIG. 13 is a top view illustrating a configuration of a wavelength selective switch according to a fourth embodiment of the present invention.

FIG. 13 is a top view illustrating a configuration of a wavelength selective switch 1 according to a fourth embodiment of the present invention. The wavelength selective switch 1 is configured by including the input/output portion 10, the micro lens array 11, the cylindrical lenses 12, 13, a condenser lens 31, a transmissive dispersive element 32, a mirror (reflective element) 33, and the deflector 17.

The input/output portion 10, the micro lens array 11, the cylindrical lenses 12, 13 are optical elements similar to those of the first embodiment. The condenser lens 31 is disposed between the cylindrical lens 13 and the dispersive element 32 so that the distance between the condenser lens 31 and the light-condensing point formed by the cylindrical lenses 12, 13 in the z direction and the distance between the condenser lens 31 and the center of the dispersive element 32 are both equal to the focal length of the condenser lens 31. Here, the optical system formed of the micro lens array 11 and the cylindrical lenses 12, 13 has an optical axis in the xz plane arranged off in the second direction (x direction) from the optical axis of the condenser lens 31. These optical axes are at the same height position in the first direction (y direction). Further, the deflector 17 is arranged with the deflection element 18 facing toward the condenser lens 31 side, at the substantially same position in the z direction as the light-condensing position formed by the cylindrical lenses 12, 13, as being staggered in the second direction (x direction) to the side where the optical axis of the condenser lens 31 passes through. In other words, the distance between the condenser lens 31 and the deflector 17 is also equal to the focal length of the condenser lens 31.

The dispersive element 32 and the mirror 33 form a dispersive portion having a so-called Littman-Metcalf configuration. Specifically, light diffracted (dispersed) by the dispersive element 32 is reflected by the mirror 33, and then diffracted (dispersed) again by the dispersive element 32. When light passes through the dispersive element twice to be diffracted (dispersed) as described above, a large dispersion angle may be obtained.

Further, the mirror 33 has a reflecting surface 33a formed as a nonplanar surface, and also serves as the light-condensing position shift compensating element that has an optical power in the dispersion direction of the dispersive element 32 according to the position in the first direction (y direction). For example, the reflecting surface 33a of the mirror 33 has no optical power in the first direction (y direction). The mirror 33 is configured so that the reflecting surface 33a is formed of a curved surface which has a linear xz section at the same height position as the optical axis in the first direction (y direction) while having a negative optical power which increases as the distance from the height position in the first direction (y direction).

With the above-mentioned configuration, input light input from any of the input/output ports 10a to 10c and 10e of the input/output portion 10 is collimated into parallel light beams by the corresponding micro lens in the micro lens array 11 and condensed by the cylindrical lenses 12 and 13. The light then passes through the condenser lens 31 as parallel light beams so as to be dispersed into wavelength-demultiplexed lights by the dispersive element 32, folded back by the mirror 33, and further dispersed by the dispersive element 32, so as to be condensed on the deflection element 18 of the deflector 17 by the condenser lens 31. The wavelength-demultiplexed lights are reflected by the deflection element 18 at different angles for each wavelength, and returns the optical path the light has travelled until being reflected by the deflection element 18, so as to be output to the input/output port 10d of the input portion 10.

Here, input light input from an input/output port which is distant from the optical axis is subjected to the light-condensing position shift compensation by the reflecting surface 33a of the mirror 33 so as not to cause position shift of the light-condensing position in the second direction (y direction) at the deflection element 18. Therefore, similarly to the first embodiment, light dispersed into wavelength-demultiplexed lights by the dispersive element 32 can be condensed, with high accuracy, on the deflection element surface of the deflection element 18, regardless of the positions of the input/output ports 10a to 10c and 10e from which the light has been input. Further, the mirror 33 is used to fold back the optical system and the device includes a smaller number of lenses as compared to the first embodiment, which reduces a space required for mounting, to thereby make the device compact. Even when the output port 10d is used as an input port, the light-condensing position shift compensating element 20 may preferably be configured so as to allow input light input from the input/output port 10d to be condensed with high accuracy on the deflection element surface of any of the deflection element 18.

<Fifth Embodiment>

Figure 14A:
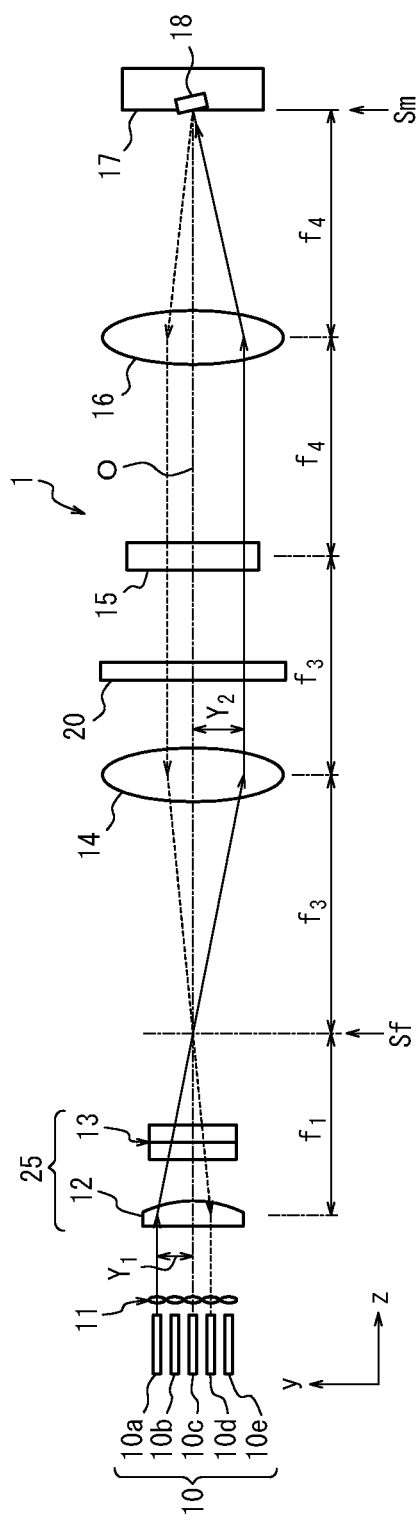
FIG. 14A is a side view illustrating a configuration of a wavelength selective switch according to a fifth embodiment of the present invention.
Figure 14B:
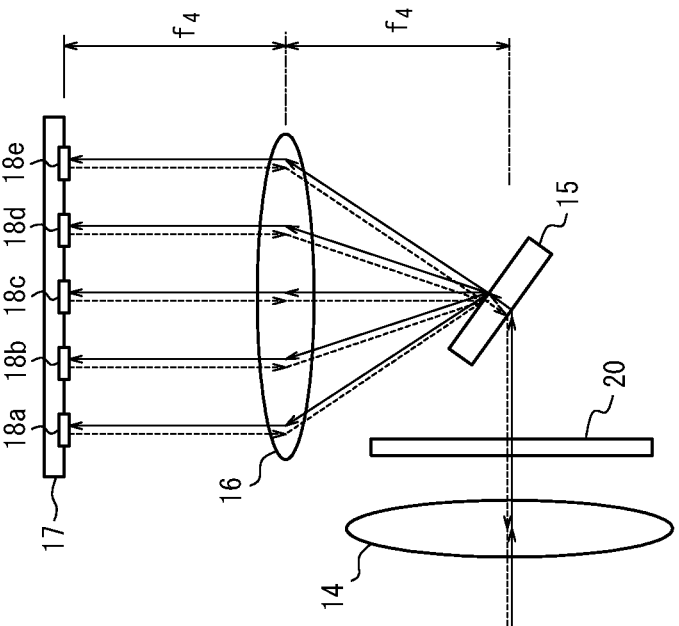
FIG. 14B is a top view illustrating a configuration of the wavelength selective switch according to the fifth embodiment of the present invention.

FIGS. 14A and 14B are a side view and a top view, respectively, each illustrating a configuration of a wavelength selective switch 1 according to a fifth embodiment of the present invention. This embodiment is different from the first embodiment in that the light-condensing position shift compensating element 20 is disposed between the lens 14 and the dispersive element 15, rather than between the micro lens array 11 and the cylindrical lens 12. In this case, the cylindrical lenses 12 and 13 form the beam shaping optical system 25. Other configurations and effects are similar to those of the first embodiment. Accordingly, the same constituent elements are denoted by the same reference symbols, and the description thereof is omitted. Even with this configuration, similarly to the first embodiment, light dispersed into wavelength-demultiplexed lights by the dispersive element 15 can be condensed, with high accuracy, on the deflection element surface of the deflection element 18, regardless of the positions of the input/output ports 10a to 10c and 10e from which the light has been input. This can therefore prevent crosstalk, which is otherwise generated by light beams of different wavelengths entering the same deflection element, and degradation in optical coupling efficiency to the output port, to thereby improve communication quality. Even when the output port 10d is used as an input port, the light-condensing position shift compensating element 20 may preferably be configured so as to allow input light input from the input/output port 10d to be condensed with high accuracy on the deflection element surface of the deflection element 18.

<Sixth Embodiment>

Figure 15A:
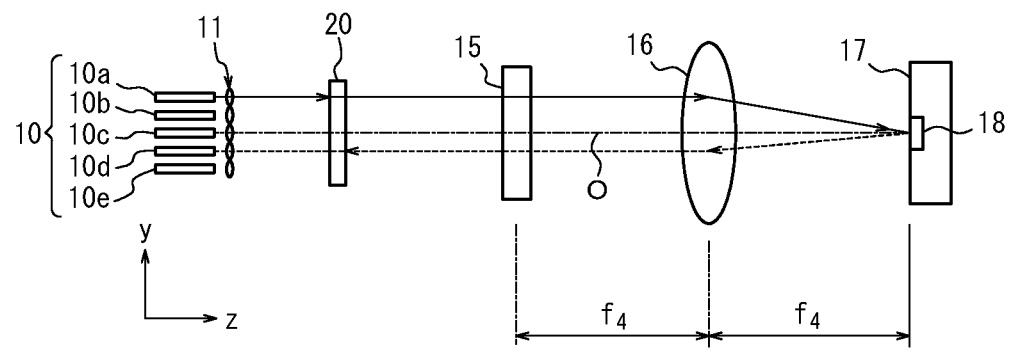
FIG. 15A is a side view illustrating a configuration of a wavelength selective switch according to a sixth embodiment of the present invention.
Figure 15B:
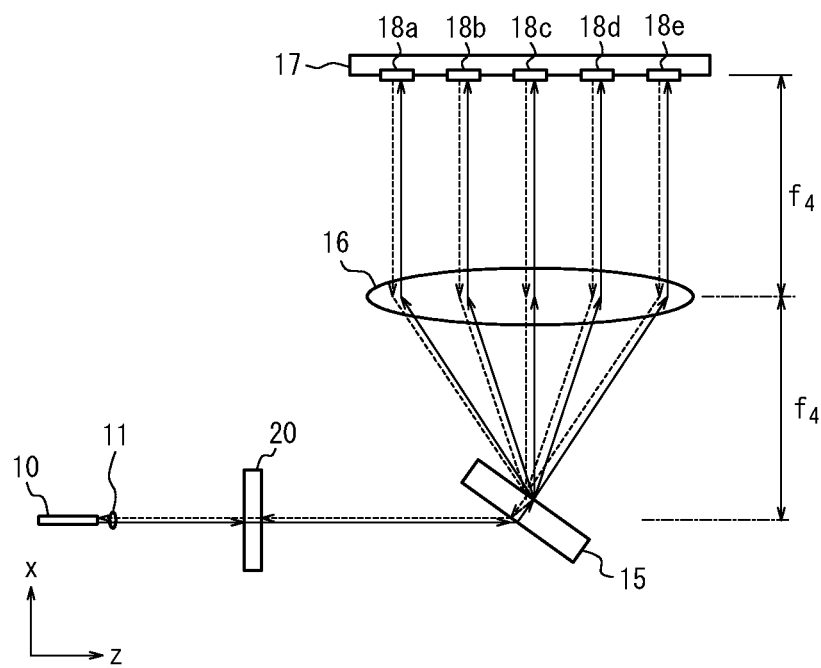
FIG. 15B is a top view illustrating a configuration of the wavelength selective switch according to the sixth embodiment of the present invention.

FIGS. 15A and 15B are a side view and a top view, respectively, each illustrating a configuration of a wavelength selective switch 1 according to a sixth embodiment of the present invention. This embodiment is different from the first embodiment in that the beam shaping optical system 25 and the lens 14 are not provided, and the light-condensing position shift compensating element 20 is disposed between the micro lens array 11 and the dispersive element 15. With this configuration, input light input from the input/output port 10a to 10c and 10e passes through the micro lens array 11 so as to be incident, as parallel light beams, on the dispersive element 15. Other configuration and effects are similar to those of the first embodiment. Accordingly, the same constituent elements are denoted by the same reference symbols, and the description thereof is omitted.

According to this embodiment, without performing beam shaping for forming an elliptical spot on the deflection element 18, the light-condensing position shift in the second direction (x direction) on the deflection element 18 can be compensated similarly to the first embodiment. Therefore, light dispersed into wavelength-demultiplexed lights by the dispersive element 15 can be condensed, with high accuracy, on the deflection element surface of the deflection element 18, regardless of the positions of the input/output ports 10a to 10c and 10e from which the light has been input. This can therefore prevent crosstalk, which is otherwise generated by light beams of different wavelengths entering the same deflection element, and degradation in optical coupling efficiency to the output port, to thereby improve communication quality. Even when the output port 10d is used as an input port, the light-condensing position shift compensating element 20 may preferably be configured so as to allow input light input from the input/output port 10d is condensed with high accuracy on the deflection element surface of the deflection element 18.

<Seventh Embodiment>

Figure 16:
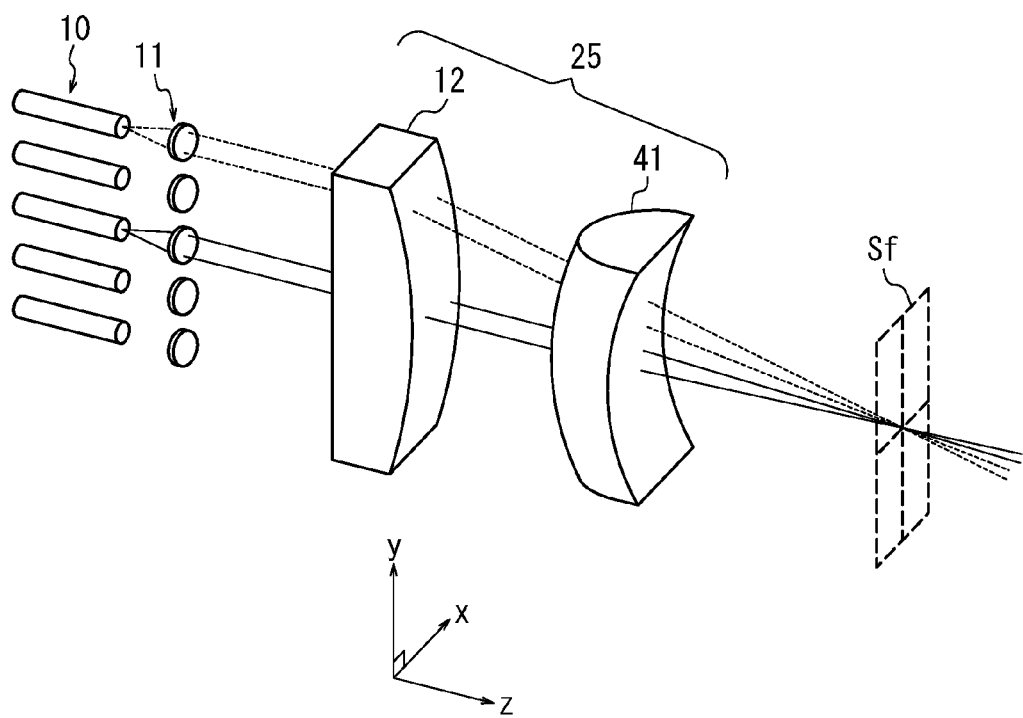
FIG. 16 is a perspective view for illustrating a configuration of a wavelength selective switch from the input/output ports to the vicinity of the primary light-condensing plane and beams passing therethrough, according to a seventh embodiment of the present invention.

FIG. 16 is a perspective view illustrating a configuration of a wavelength selective switch 1 from the input/output ports 10 to the vicinity of the primary light-condensing plane Sf and beams passing therethrough, according to a seventh embodiment of the present invention. This embodiment is similar in configuration to the first embodiment, and includes a light-condensing position shift compensating element 41 which is different in shape from the light-condensing position shift compensating element 20 of the first embodiment, in place of the light-condensing position shift compensating element 20 and the cylindrical lens 13, at a position where the cylindrical lens 13 of the first embodiment is arranged.

Figure 17A:
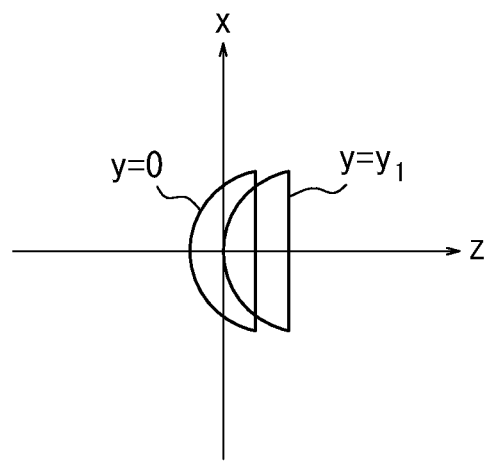
FIG. 17A illustrates a position and a shape of the light-condensing position compensating element of FIG. 16 in section taken along a plane parallel to the xz plane.
Figure 17B:
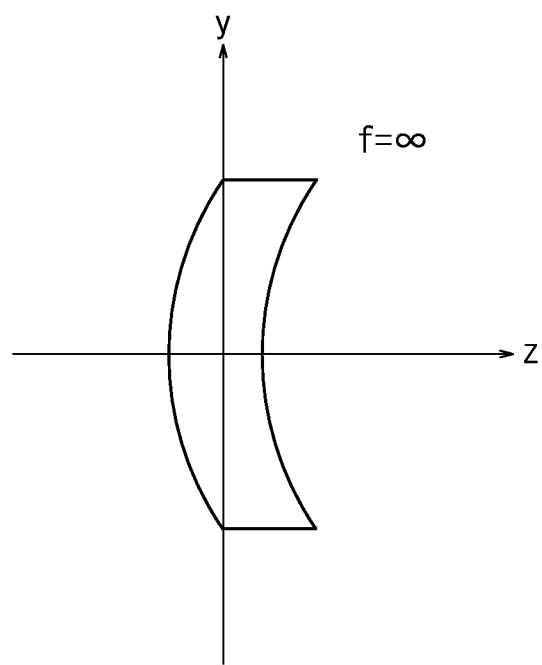
FIG. 17B is a sectional view of the light-condensing position compensating element of FIG. 16 taken along the yz plane.

FIG. 17A illustrates a position and a shape of the light-condensing position compensating element 41 of FIG. 16 in section taken along a plane parallel to the xz plane. FIG. 17B is a sectional view of the light-condensing position compensating element 41 of FIG. 16 taken along the yz plane. As illustrated in FIG. 17A, the section of the light-condensing position shift compensating element 41 has an arc, which is, for example, in a substantially semicircular shape regardless of the height position from the optical axis in the first direction (y direction). This semicircular sectional shape shifts in the traveling direction of the input light (toward the primary light-condensing plane Sf side) along the z axis as the distance from the optical axis. As illustrated in FIG. 17B, the section of the reflecting surface of the light-condensing position shift compensating element 41 perpendicular to the second direction (x direction) is curved in the traveling direction (z direction) of the input light according to the position in the first direction (y direction). In other words, the both ends in the y direction of the light-condensing position shift compensating element 41 further extend, as compared to the central portion in the y direction, toward the z direction.

The light-condensing position shift compensating element 41 is different from the light-condensing position shift compensating element employed in the first to fifth embodiments in that it has a constant optical power in the second direction (x direction) irrespective of the distance from the optical axis in the first direction (y direction). The light-condensing position shift compensating element 41 has a refracting interface shifted in the optical axis direction according to the distance from the optical axis, to thereby adjust the light-condensing position. Other configurations are similar to those of the first embodiment. Accordingly, the same constituent elements are denoted by the same reference symbols, and the description thereof is omitted.

According to this embodiment, with the use of the light-condensing position shift compensating element 41 that does not have an optical power distribution in the second direction (x direction), the light-condensing position shift in the second direction (x direction) on the deflection element 18 can be compensated similarly to the first embodiment. Therefore, light dispersed into wavelength-demultiplexed lights by the dispersive element 15 can be condensed with high accuracy on the deflection element surface of the deflection element 18, regardless of the position of any of the input/output ports 10a to 10c and 10e from which the input light has been input. This can therefore prevent crosstalk, which is otherwise generated by light beams of different wavelengths entering the same deflection element 18, and degradation in optical coupling efficiency to the output port, to thereby improve communication quality. Even when the output port 10d is used as an input port, the light-condensing position shift compensating element 20 may preferably be configured so as to allow input light input from the input/output port 10d to be condensed with high accuracy on the deflection element surface of the deflection element 18.

<Eighth Embodiment>

Figure 18:
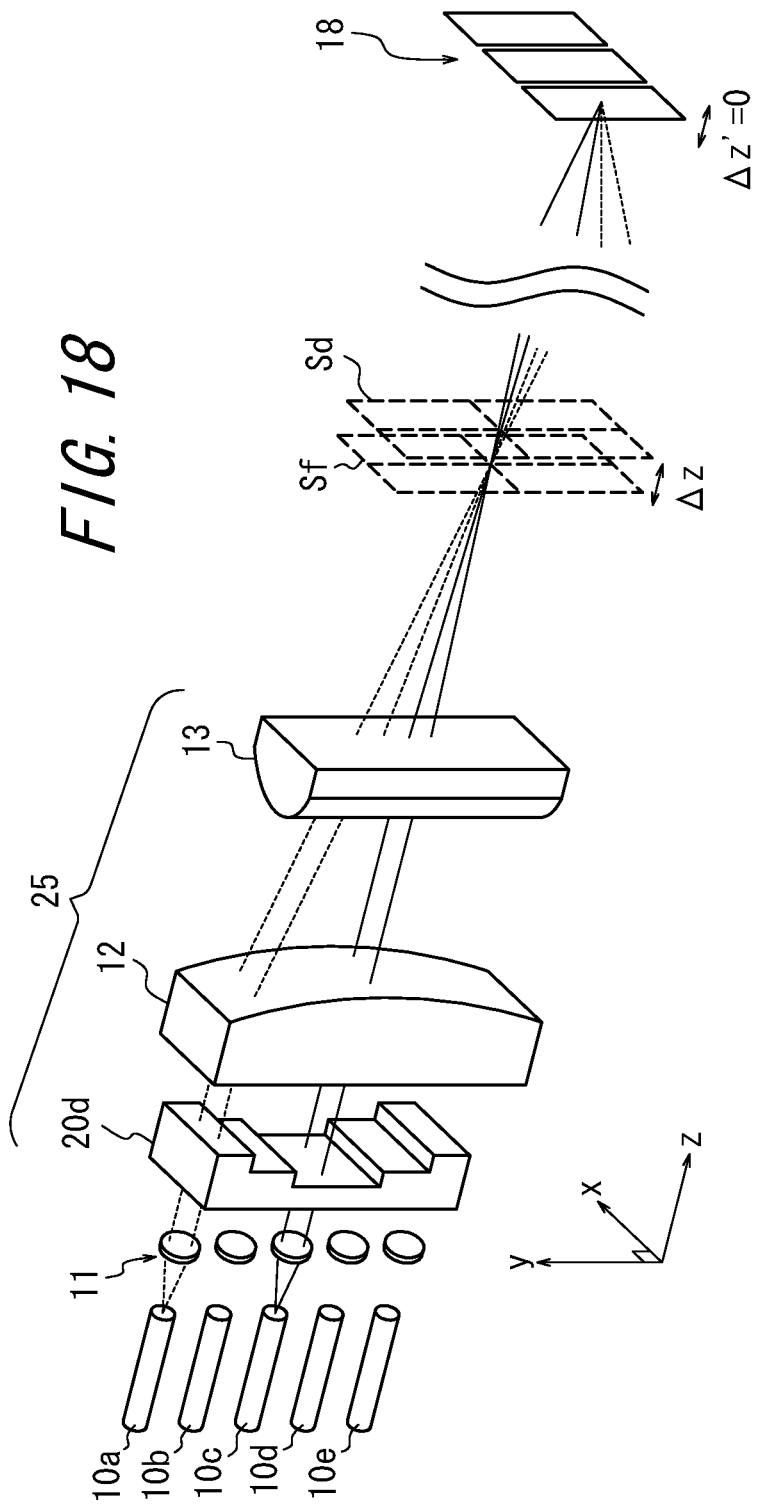
FIG. 18 is a perspective view illustrating part of a configuration of a wavelength selective switch according to an eighth embodiment of the present invention.

FIG. 18 is a perspective view illustrating part of a configuration of a wavelength selective switch according to an eighth embodiment of the present invention, which particularly shows beams traveling from the input/output ports 10a to 10e to the vicinity of the primary light-condensing plane Sf and beams in the vicinity of the deflection element 18. This embodiment is different from the first embodiment in that the light-condensing position shift compensating element 20 of the first embodiment is replaced by the light-condensing position shift compensating element 20d of FIG. 18. Although not shown in FIG. 18, the lens 14, the dispersive element 15, the lens 16, and the deflector 17 including the deflection element 18 are disposed downstream of the cylindrical lens 13, similarly to the wavelength selective switch 1 of the first embodiment. The light-condensing position shift compensating element 20d in this optical system does not have an optical power in either of the first direction (y direction) and the second direction (x direction), and is configured so that input light beams from the respective input/output ports 10a to 10e pass through optical paths that are different in air equivalent length. The "air equivalent length" is designated as d/n, where n represents a refractive index of a medium and d represents a distance traveled by light through the medium along an optical path.

In this embodiment, the light-condensing position shift compensating element 20d is configured to be small in thickness in the traveling direction of input light (z direction) in the central region in the first direction (y direction), and the thickness increases along stair-like steps as the distance from the optical axis in the first direction (y direction). Further, each region receiving a light beam incident from each of the input/output ports 10a to 10e is formed without falling across a difference in level of the steps so as to be uniform in element thickness. Meanwhile, the surface facing the input/output ports is formed as a coplanar surface. When the input light is assumed to be a Gaussian beam, the light beam spatially diverges infinitely. However, in this embodiment, the beam diameter is defined by a region where the beam power is reduced to $1/e^2$ of the beam power at the central region.

The light-condensing position shift compensating element 20d is formed of a transparent material in the use frequency, and is formed by using, for example, optical glass and semiconductors such as a resin or silicon. It is preferred to use a material that is large in refractive index in order to produce a large compensation effect without increasing the thickness of the material.

The light-condensing position shift compensating element 20d is disposed so as to make the air equivalent length dependent on the port position without changing the physical distance from each of the input/output ports to the cylindrical lenses 12 and 13. With this configuration, the light-condensing position of input light passing through a position away in the first direction (y direction) from the optical axis is shifted in a direction toward the lens 14.

Therefore, similarly to the first embodiment, light dispersed into wavelength-demultiplexed lights by the dispersive element 15 can be condensed, with high accuracy, on the deflection element surface of the deflection element 18, regardless of the positions of the input/output ports 10a to 10c and 10e from which the light has been input. Further, the light-condensing position shift compensating element 20d is formed of an element that does not have an optical power and hence there is no need for high accuracy in the adjustment in the z direction, which makes the assembly easy.

Figure 19:
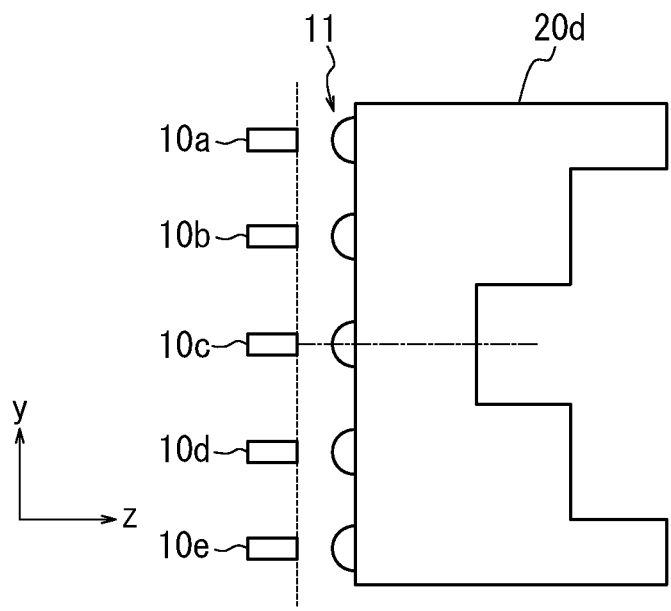
FIG. 19 is a view illustrating an exemplary configuration of a micro lens and a light-condensing position shift compensating element that are integrally formed.

Further, in this embodiment, the micro lenses in the micro lens array 11 and the light-condensing position shift compensating element 20d may be integrally formed, as illustrated in FIG. 19. In other words, the beam shaping optical system 25 and the micro lens array 11 may be integrally formed. The operation part of the micro lens array 11 and the operation part of the light-condensing position shift compensating element 20d may be formed from a single member. Alternatively, the micro lenses and the light-condensing position shift compensating element may be independently manufactured and cemented to each other, to so as to be integrally formed. When forming the operation parts through cementing, it is necessary to take some measures to reduce noise resulting from reflection at the interface. For example, micro lenses and a light-condensing position shift compensating element may preferably be formed of the same material, which may be cemented to each other through direct cementing such as optical contact or anode bonding, or may be cemented to each other using an adhesive of matched refractive index.

Figure 20:
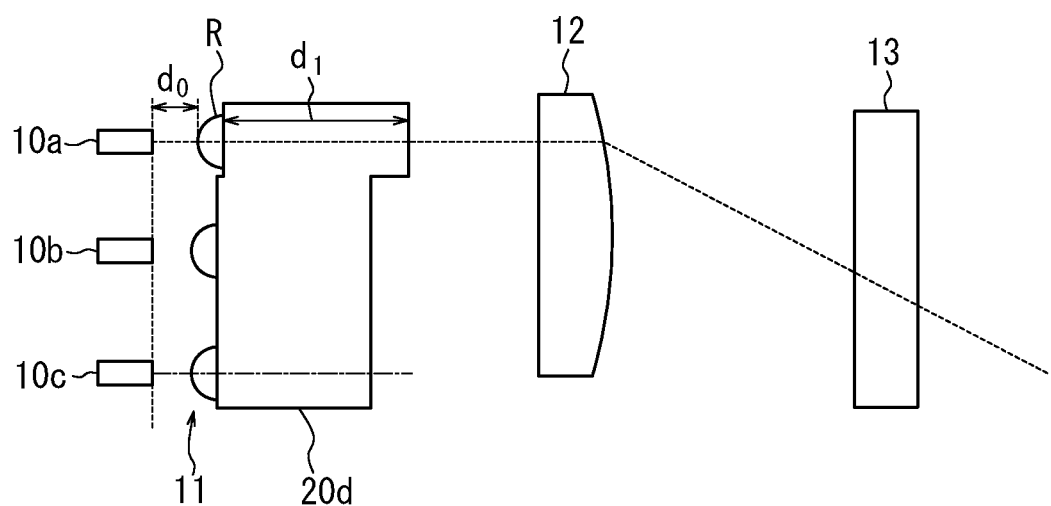
FIG. 20 is a view for illustrating adjustments to be made to a distance between the input/output port and the micro lens array and to the curvature radius of the micro lens.

Further, in this embodiment, as illustrated in FIG. 20, in addition to the thickness $d_1$ of the light-condensing position shift compensating element 20d, the distance $d_0$ between the input/output ports 10a to 10e and the micro lens array 11, and the curvature radius R may also be specified. With this configuration, light dispersed into wavelength-demultiplexed lights by the dispersive element 15 can be condensed, with further high accuracy and increased degree of freedom, on the deflection element surface of the deflection element 18, regardless of the positions of the input/output ports 10a to 10c and 10e from which the light has been input. Alternatively, each lens in the micro lens array 11 may be formed rotationally asymmetric (anamorphic). This configuration allows the compensation effect in the first direction (y direction) and the compensation effect in the second direction (x direction) to be designed more independently of each other.

Further, the air equivalent lengths of the optical paths are not necessarily different from each other depending on each one of the input/output ports, as long as there are provided at least two different air equivalent lengths, namely, at least an air equivalent length relative to input/output ports near the optical axis center and an air equivalent length relative to input/output ports distant from the optical axis. In this case, when light beams from input/output ports adjacent to each other are input across a boundary between different air equivalent lengths of the light-condensing position shift compensating element 20d, the interval between those input/output ports may be increased as compared to the intervals of other ports. With this configuration, light input from one input/output port is prevented from being separated at the boundary.

Further, the feature of the light-condensing position shift compensating element 20d in this embodiment resides in that the air equivalent lengths of the optical paths are different from each other, rather than in that the thickness of the element are different in the first direction (y direction). Therefore, the light-condensing position shift compensating element 20d may be formed in a uniform thickness in the first direction while including different materials depending on the position in the first direction, to thereby change the refractive index.

Further, the above-mentioned description has been given of the embodiment in which the light-condensing position shift compensating element 20d is disposed at a position capable of achieving optimal benefit. However, the arrangement of the light-condensing position shift compensating element 20d is not limited thereto, and the compensation effect may still be obtained as long as it is disposed at a position where input light beams from the input/output ports are separated for each port.

Further, in the above-mentioned embodiment, the light-condensing position shift compensating element 20d and the cylindrical lens 12 are disposed separate from each other. Alternatively, however, the light-condensing position shift compensating element 20d may be turned around in the z direction so that the planar surfaces of the light-condensing position shift compensating element 20d and the cylindrical lens 12 opposed to each other are brought into contact with each other, or the light-condensing position shift compensating element 20d and the cylindrical lens 12 may be integrally formed.

<Ninth Embodiment>

Figure 21A:
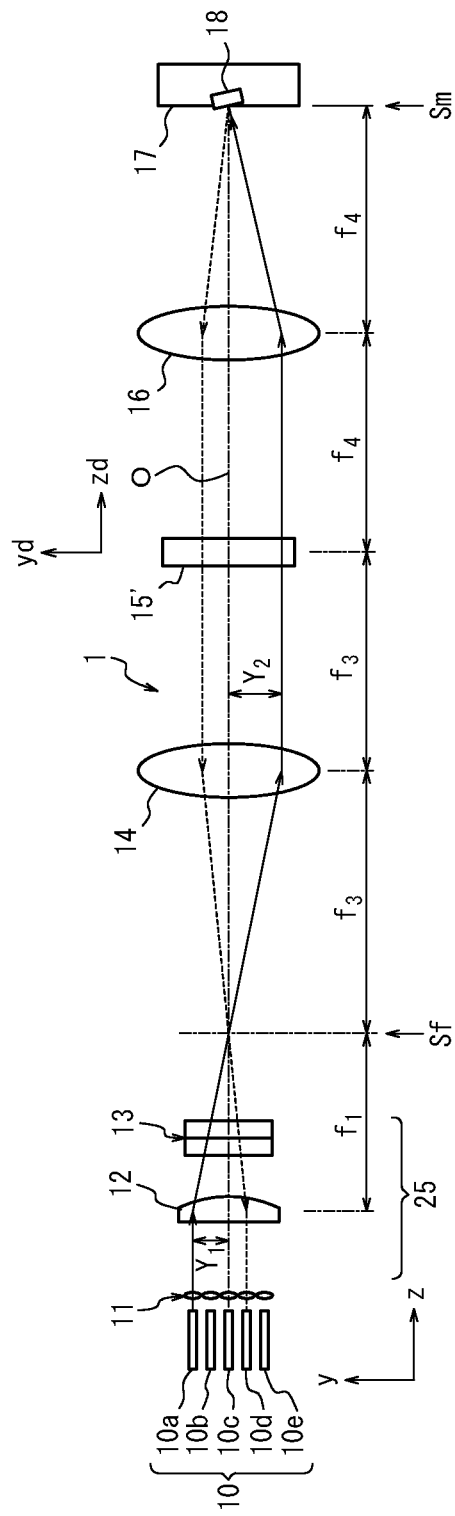
FIG. 21A is a side view illustrating a configuration of a wavelength selective switch according to a ninth embodiment of the present invention.
Figure 21B:
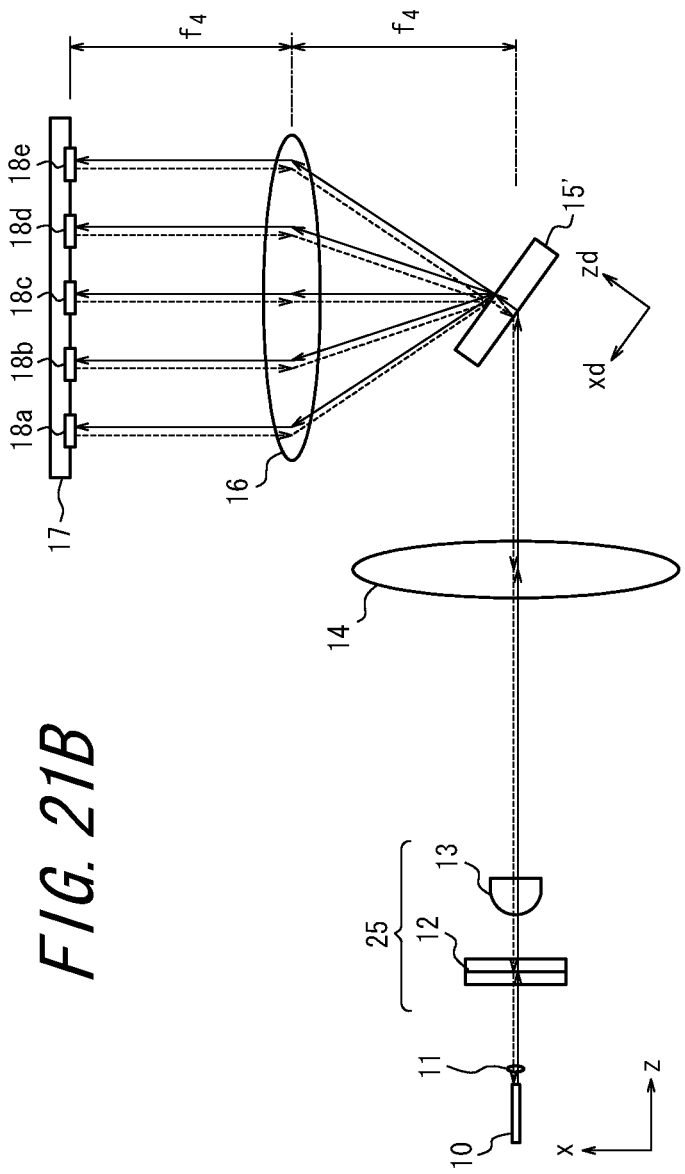
FIG. 21B is a top view illustrating a configuration of the wavelength selective switch according to the ninth embodiment of the present invention.

FIGS. 21A and 21B are views illustrating a configuration of a wavelength selective switch according to a ninth embodiment of the present invention. The wavelength selective switch is different from the wavelength selective switch of FIGS. 1A and 1B according to the first embodiment in that the light-condensing position shift compensating element 20 is not provided in the beam shaping optical system 25, and a dispersive element 15' is provided with a function of the light-condensing position shift compensating element. In other words, the dispersive element and the light-condensing position shift compensating element in this embodiment are integrally formed.

Figure 22:
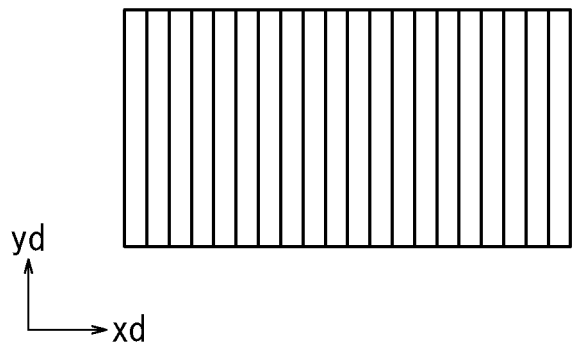
FIG. 22 is a front view of a grating of a conventional dispersive element.

In the following, description is given of a configuration of the dispersive element 15' with reference to FIGS. 22 to 24. The local coordinates on the dispersive element 15' are denoted by xd, yd, and zd. FIG. 22 is a front view of a conventional dispersive element. The dispersive element has a diffraction grating, and the diffraction grating is pitched at regular intervals across the whole area. The dispersive element 15 of the first embodiment has a uniform pitch described above.

Figure 23:
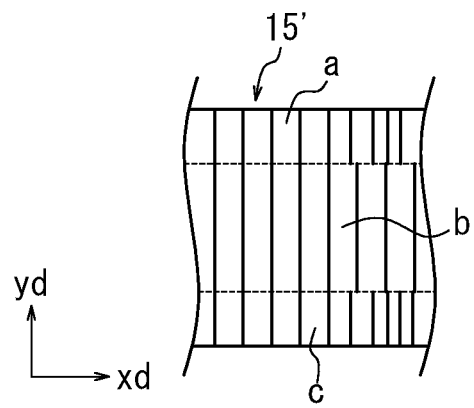
FIG. 23 is a view of a grating of the dispersive element of FIGS. 21A and 21B.

On the other hand, FIG. 23 is a view illustrating a grating of the dispersive element 15' according to this embodiment. The dispersive element 15' is sectioned into three regions in the yd direction as illustrated in FIG. 23, in which a region a and a region c have a grating pitch of the same characteristics. The region a and the region c each have a pitch that sequentially changes along the second direction xd. On the other hand, a center region b has a grating which is pitched at regular intervals, similarly to the first embodiment. The grating of the center region b is discontinuous to the gratings of the region a and the region b.

Figure 24:
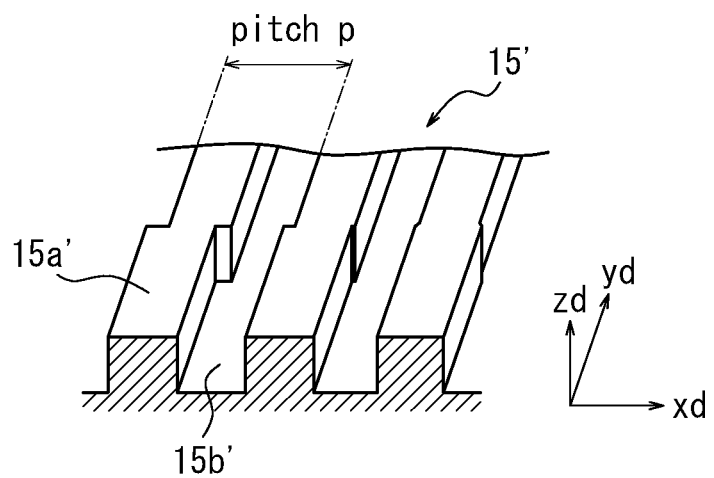
FIG. 24 is a perspective view illustrating part of the dispersive element of FIGS. 21A and 21B, together with a section thereof.

FIG. 24 is a perspective view of the dispersive element 15'. The grating forming a diffraction plane has a convex portion 15'a and a concave portion 15'b. The height of the convex portion 15'a and the ratio in width of the concave portion 15'b and the convex portion 15'a are optimized so as to obtain maximum diffracted light amount. When light is diffracted by a diffraction grating, a difference is generated between P-polarized light and S-polarized light if no measure is taken. In view of this, the convex portion 15'a may be formed of a plurality of laminated dielectric bodies, so as to eliminate the difference in diffracted light amount depending on the polarization direction.

With the above-mentioned configuration, the wavelength selective switch according to this embodiment does not include the light-condensing position shift compensating element 20, and hence, as illustrated in FIG. 25, light from an input/output port distant from the optical axis, for example, a light beam from the input/output port 10a is not condensed on the primary light-condensing plane Sf, and rather condensed on the dummy plane Sd which is at a distance of Δz to the cylindrical lens 13 side from the primary light-condensing plane Sf.

Figure 26A:
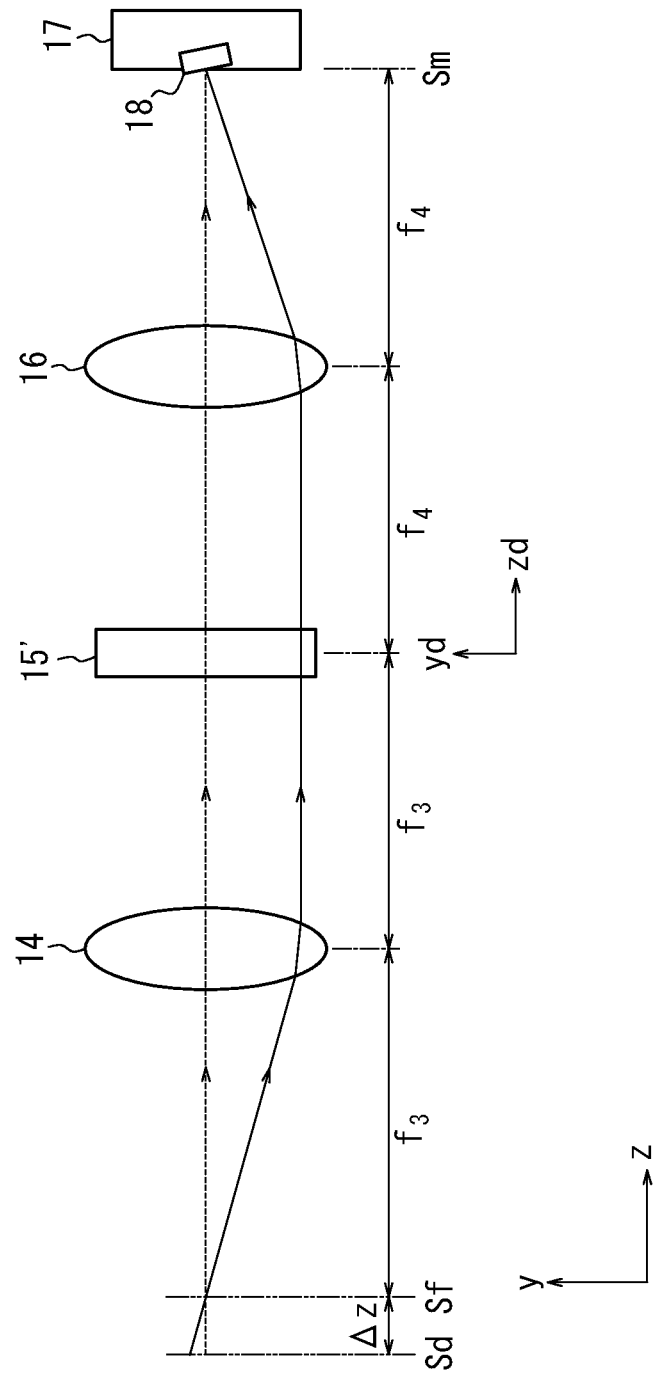
FIG. 26A is a side view for illustrating an optical path from the vicinity of the primary light-condensing plane Sf to the deflector 17.
Figure 26B:
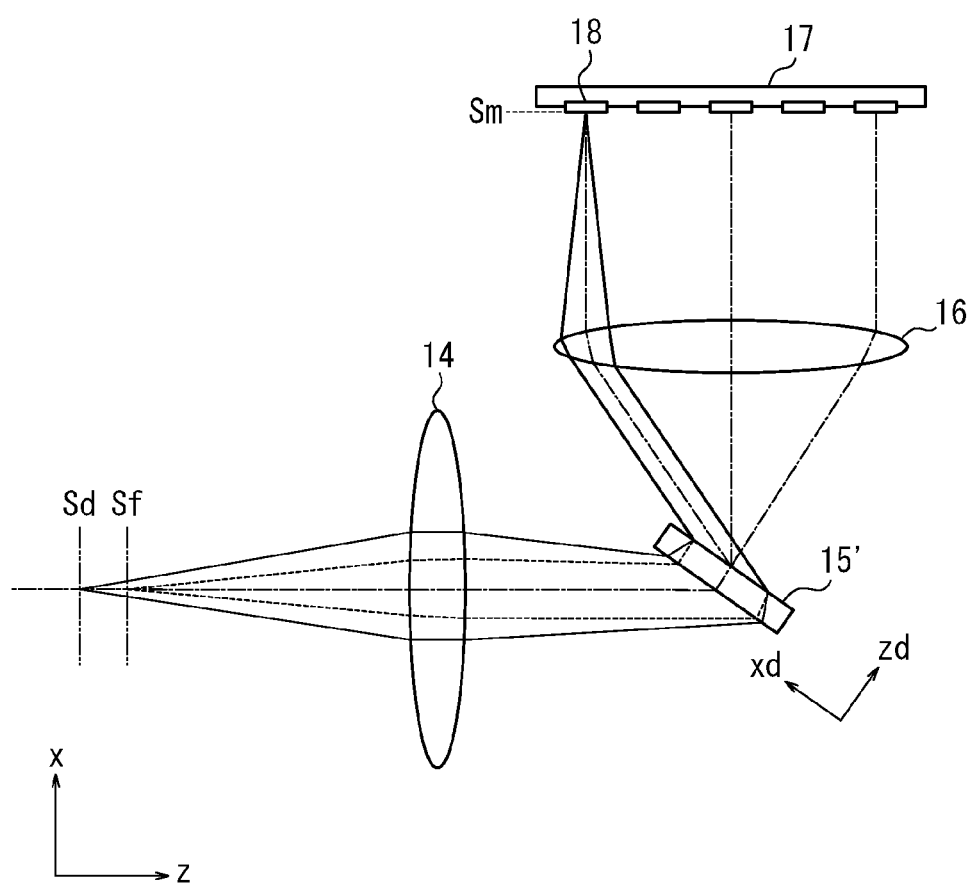
FIG. 26B is a top view for illustrating an optical path from the vicinity of the primary light-condensing plane Sf to the deflector 17.

FIGS. 26A and 26B illustrate a configuration downstream of the primary light-condensing plane Sf. In the drawings, the light beam from the input/output port 10a is rendered by a solid line, while the light beam from the input/output port 10c is rendered by a broken line. Input light from the input/output port 10c passes through the optical system substantially along the optical axis. The input light is condensed on the primary light-condensing plane Sf, collimated by the lens 14 into parallel light beams that travel along the optical axis, and dispersed into wavelength-demultiplexed lights by the dispersive element 15', so that the wavelength-demultiplexed lights are condensed, by the lens 16, onto the element surface (mirror surface) of each of the deflection elements 18 on the deflector 17.

On the other hand, input light from the input/output port 10a is condensed on the dummy plane Sd which is at a distance of $\Delta z$ to the cylindrical lens 13 side from the primary light-condensing plane Sf, and therefore, the input light is converted thereafter, by the lens 14, into light beams slightly converging as compared to parallel light beams and made incident on the dispersive element 15'. The light is incident on the dispersive position 15' at a position distant from the optical axis in the yd direction, that is, on the region c of FIG. 23.

The region c has a grating which is pitched at different intervals along the xd direction so as to have an optical power, and disperses light beams incident thereon as converged light beams, into wavelength-demultiplexed lights as parallel light beams. Therefore, similarly to the light beam from the input/output port 10c, the wavelength-demultiplexed light beams thus dispersed are condensed, by the lens 16, on the element surface (mirror surface) of each of the deflection elements 18 on the deflector 17. As illustrated in the top view of FIG. 26B, when viewed from the first direction (y direction), the light beams from the input/output port 10c and the light beams from the input/output port 10a are seen as overlapped with each other after being dispersed by the dispersive element 15'. Light beams reflected by the element surface Sm of each of the deflection elements 18 travel back the above-mentioned optical path in the opposite direction so as to be condensed on the input/output port 10d and output therefrom.

The grating is formed discontinuous, for example, at a boundary between the region a and the region b, where the characteristic of the grating changes. In order to prevent a light beam from any of the input/output ports 10a to 10c and 10e and a light beam traveling toward the input/output port 10d from being incident on the boundary portion, the interval between input/output ports outputting light beams that pass above and below the boundary may preferably be slightly larger than the intervals of other input/output ports. Further, in this embodiment, the diffraction plane of the dispersive element 15' is sectioned into three regions in the extending direction of the grating. However, in the case where the region c distant from the center region corresponds to two input/output ports 10a and 10b, when the grating pitch is optimized in accordance with the distance $\Delta z$ of the outermost off-axis input/output port 10a, the light-condensing position on the deflection element 18 of light beam from the input/output port 10b, which is disposed on the inside of the outermost off-axis input/output port 10a, may be overly compensated. In view of this, the number of sectioned regions may be increased, and the grating pitch may be optimized according to the distance $\Delta z$ for each input/output port, to thereby reduce to small a distance from the light-condensing positions of light beams from all the input/output ports 10a to 10c and 10e to the element surface Sm of the deflection element 18.

<Tenth Embodiment>

Figure 27:
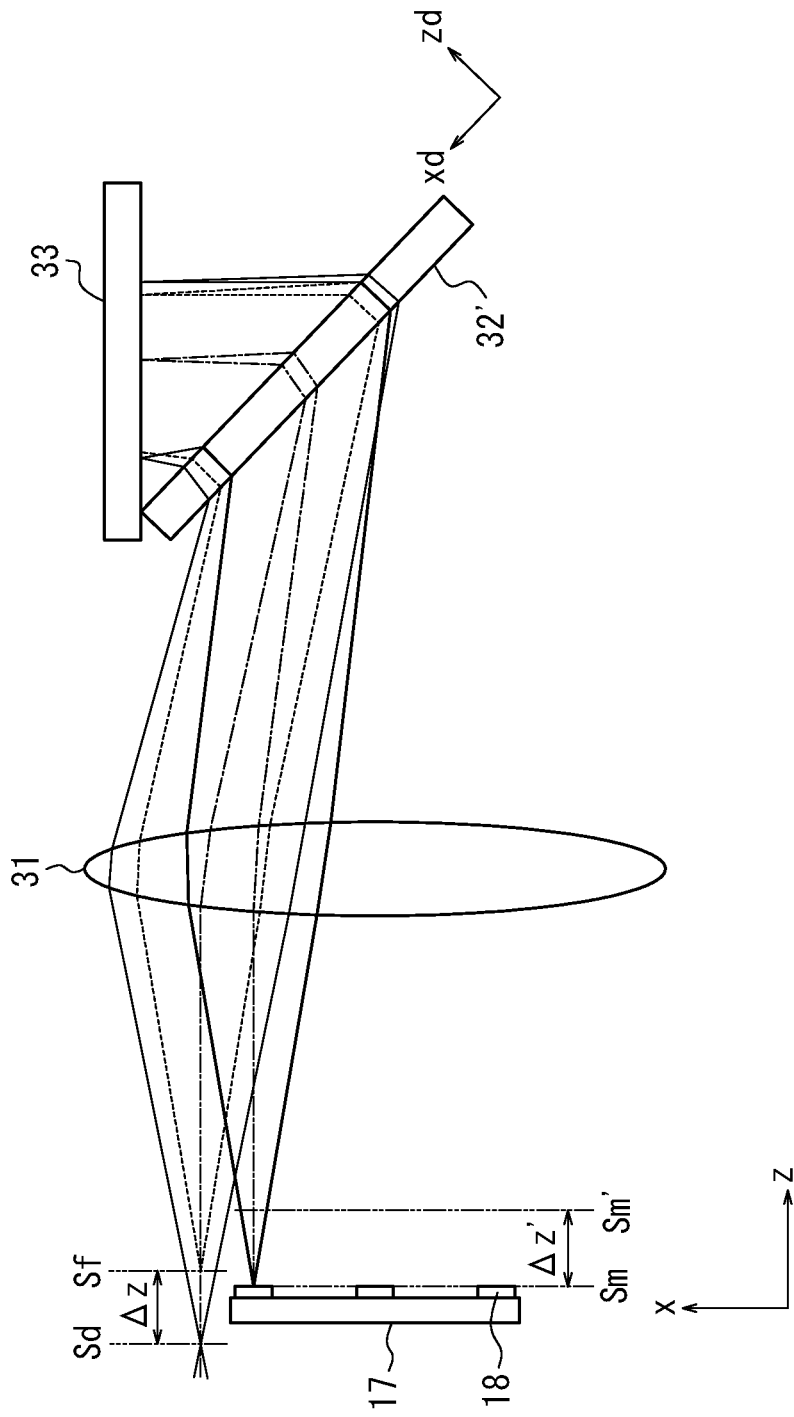
FIG. 27 is a top view of a wavelength selective switch according to a tenth embodiment of the present invention, illustrating a configuration and an optical path from the vicinity of a primary light-condensing plane to a deflector.

FIG. 27 is a top view of a wavelength selective switch according to a tenth embodiment of the present invention, illustrating a configuration and an optical path from the vicinity of a primary light-condensing plane to a deflector. According to this embodiment, in the wavelength selective switch according to the fourth embodiment of FIG. 13 which includes a Littman-Metcalf dispersive portion, a dispersive element 32' and the light-condensing position shift compensating element are integrally formed, without the light-condensing position shift compensating element provided in the beam shaping optical system 25. The dispersive element 32' has a discontinuous grating in the yd direction and pitched at irregular intervals in the xd direction, similarly to the dispersive element 15' of the ninth embodiment. Other configurations are similar to those of the fourth embodiment. Accordingly, the same constituent elements are denoted by the same reference symbols, and the description thereof is omitted.

Next, description is given of an optical path of the wavelength selective switch according to this embodiment. In FIG. 27, the light beam from the input/output port 10a is rendered by a solid line, while the light beam from the input/output port 10c is rendered by a broken line. The light beam from the input/output port 10c is condensed on the primary light-condensing plane Sf. After being condensed, light beams diverged from the primary light-condensing plane Sf is collimated, by the condenser lens 31, into parallel light beams, and dispersed into wavelength-demultiplexed lights by the dispersive element 32'. The wavelength-demultiplexed lights thus dispersed are reflected by the mirror 31, and further diverged by the dispersive element 32', so as to be incident on the condenser lens 31. The condenser lens 31 condenses the parallel light beams of the wavelength-demultiplexed lights thus dispersed, onto the deflecting surface (mirror surface) of the deflection element 18 of the deflector 17.

On the other hand, light beams from the input/output port 10a are condensed on the dummy plane Sd on the input/output port side than the primary light-condensing plane Sf, and hence converted, by the condenser lens 31, into light beams slightly converging as compared to parallel light beams. The dispersive element 32' is sectioned, similarly to the dispersive element 15' of FIG. 23, into three regions in the yd direction, namely, the central region b, and the region a and the region c on the outside thereof. A light beam from the input/output port 10a passes through the outside region c. The outside region c is pitched at irregular intervals, and has an optical power of dispersing slightly-converged light beams into wavelength-demultiplexed lights and converting the light beams into the divergence direction so that the wavelength-demultiplexed lights are substantially converted into the parallel light beams. These wavelength-demultiplexed lights are reflected by the mirror 33, and incident again on the dispersive element 32'. The incident light beams are further dispersed and converted into the divergence direction, so as to be converted into parallel light beams dispersed into wavelength-demultiplexed lights. The condenser lens 31 condenses the wavelength-demultiplexed lights thus dispersed, onto the deflection surface Sm (mirror surface) of the deflection element 18 of the deflector 17. Light reflected by the deflection element surface Sm (mirror surface) Sm travels back the above-mentioned optical path in the opposite direction, so as to be condensed on the emitting surface of the input/output port 10d.

Figure 28:
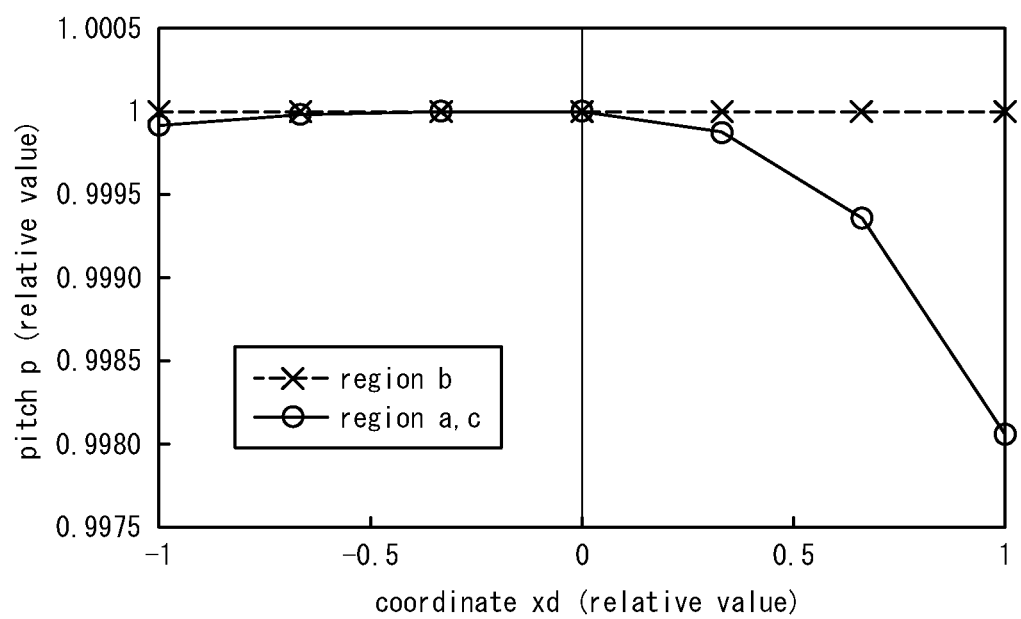
FIG. 28 is a graph showing the pitch of the dispersive element of FIG. 27.

Next, description is given of an example of a pitch of the dispersive element 32' with reference to the graph of FIG. 28. FIG. 28 shows, on the abscissa, the coordinate in the xd direction of FIG. 27, and on the ordinate, the pitch value normalized with the pitch in the center region b of the deflection element 32' being defined as 1. The broken line renders a graph relating to the center region b, and the solid line renders a graph relating to the region a and the region c. In this embodiment, the center region b is pitched at regular intervals, and hence the value on the broken line on the abscissa is 1 irrespective of the coordinate xd. Further, as shown by the solid line, the regions a and c are pitched slightly narrower in the positive direction of the coordinate xd.

Figure 29:
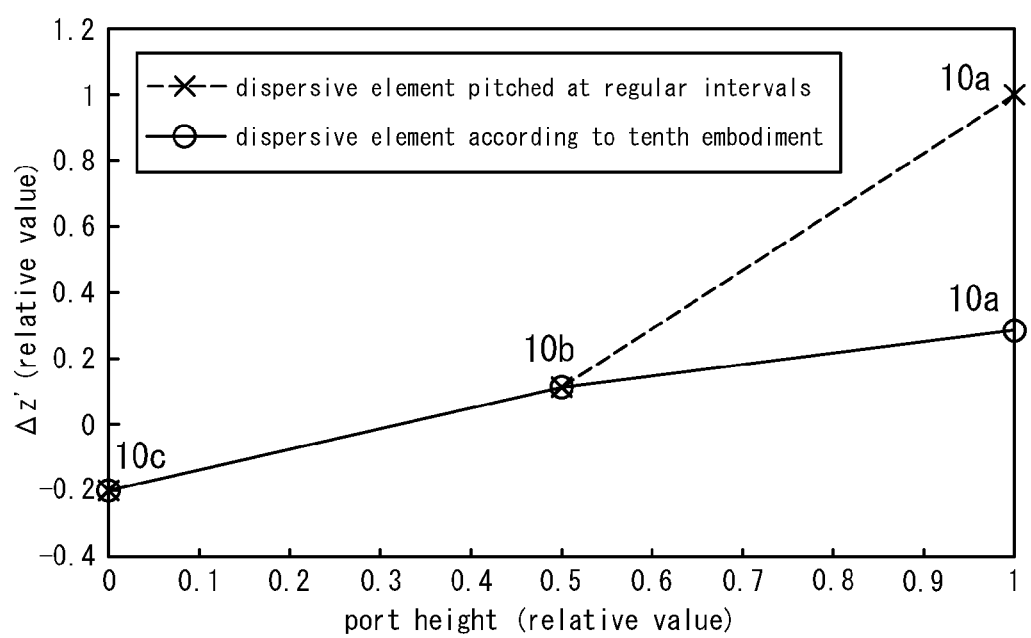
FIG. 29 is a graph showing a distance $\Delta z'$ between the mirror surface Sm and a light-condensing position Sm' of light beams from the respective ports.

FIG. 29 is a graph showing a distance Δz' between the deflection element surface (mirror surface) Sm and a light-condensing position Sm' of light beams from the respective ports. FIG. 29 shows, on the abscissa, the relative value of the port height from the optical axis, where the port height of the input/output port 10a is defined as 1. The relative value of Δz' is shown on the ordinate. The broken line shows a distance Δz' calculated for the case where a conventional grating pitched at regular intervals is used, and the solid line shows a distance Δz' calculated for the case where the dispersive element 32' according to this embodiment is used. The three points on the graph each correspond to, in order from the left, the input/output ports 10c, 10b, 10a, respectively. Here, on the ordinate, a value of Δz obtained for the input/output port 10a in the case of using a dispersive element pitched at regular intervals is defined as 1. Input light incident from the input/output port 10a passes through the region c of the dispersive element 32', while input light incident from the input/output ports 10b and 10c passes through the center region b of the dispersive element 32'. It can be appreciated that, with the use of the dispersive element 32' of this embodiment, the value Δz' of light beams incident from the input/output port 10a can be reduced to small.

This embodiment is capable of compensating the light-condensing position shift without additionally providing a separate component such as the light-condensing position shift compensating element. Further, the dispersive element having a light-condensing position shift compensating function used in this embodiment can be manufactured by a method similar to that for a conventional dispersive element, merely having to change the mask pattern, and at substantially the same cost.

As described above, similarly to the first embodiment, wavelength-demultiplexed lights dispersed by the dispersive element 32' can be condensed, with high accuracy, at a position optically conjugate to the emitting surface of the input/output port 10d serving as output port, regardless of the positions of the input/output ports 10a to 10c and 10e from which the light has been input, to thereby provide a low-costed wavelength selective switch having a reduced insertion loss resulting from degradation in coupling efficiency, regardless of which of the input/output ports is used.

<Eleventh Embodiment>

FIG. 30 is a perspective view illustrating part of a configuration of a wavelength selective switch according to an eleventh embodiment of the present invention. FIG. 30 illustrates beams traveling from the input/output ports 10a to 10e to the vicinity of the light-condensing point and beams in the vicinity of the deflection element 18'. This embodiment is different from the wavelength selective switch according to the first embodiment in that a mirror element is employed as the deflection element 18' and the light-condensing position shift compensating element 20 is replaced by the light-condensing position shift compensating element 20e of FIG. 30, the mirror element having a turning center off in the first direction relative to the position where each of the wavelength-demultiplexed lights from the input ports on the deflection surface of the deflection element 18' is deflected. Although not shown in FIG. 30, the lens 14, the dispersive element 15, the lens 16, and the deflector 17 including the deflection element 18' are arranged downstream of the cylindrical lens 13 similarly to the wavelength selective switch 1 of the first embodiment. Other configurations are similar to those of the first embodiment. Accordingly, the same constituent elements are denoted by the same reference symbols, and the description thereof is omitted.

The deflector 17 is, for example, a MEMS mirror array, and the deflection elements 18' include micro mirrors forming the MEMS mirror array. Here, in this embodiment, the deflection element 18' is changed in tilt in the yz plane of FIG. 1A about a turning axis, which is off in the first direction from the position where wavelength-demultiplexed lights dispersed are deflected. Such a mirror configuration is made so as to satisfy a requirement for ensuring enough space for electrode arrangement in the case where the MEMS mirror array is reduced in pitch, and results from a cantilever type mirror configuration which is easy to manufacture. With the use of the mirror array configured as described above, the deflection element surface Sm is no longer a fixed surface, as illustrated in FIG. 30 as Sma and Smb.

Figure 31A:
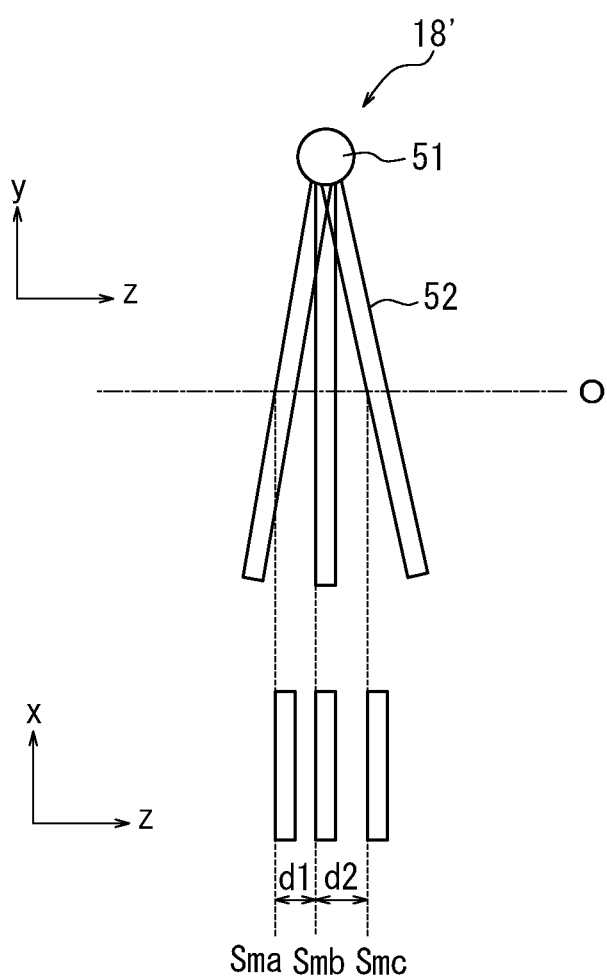
FIG. 31A is a schematic diagram illustrating displacement of the deflection element surface Sm when the micro mirror of FIG. 30 is turned relative to the turning axis of the mirror.
Figure 31B:
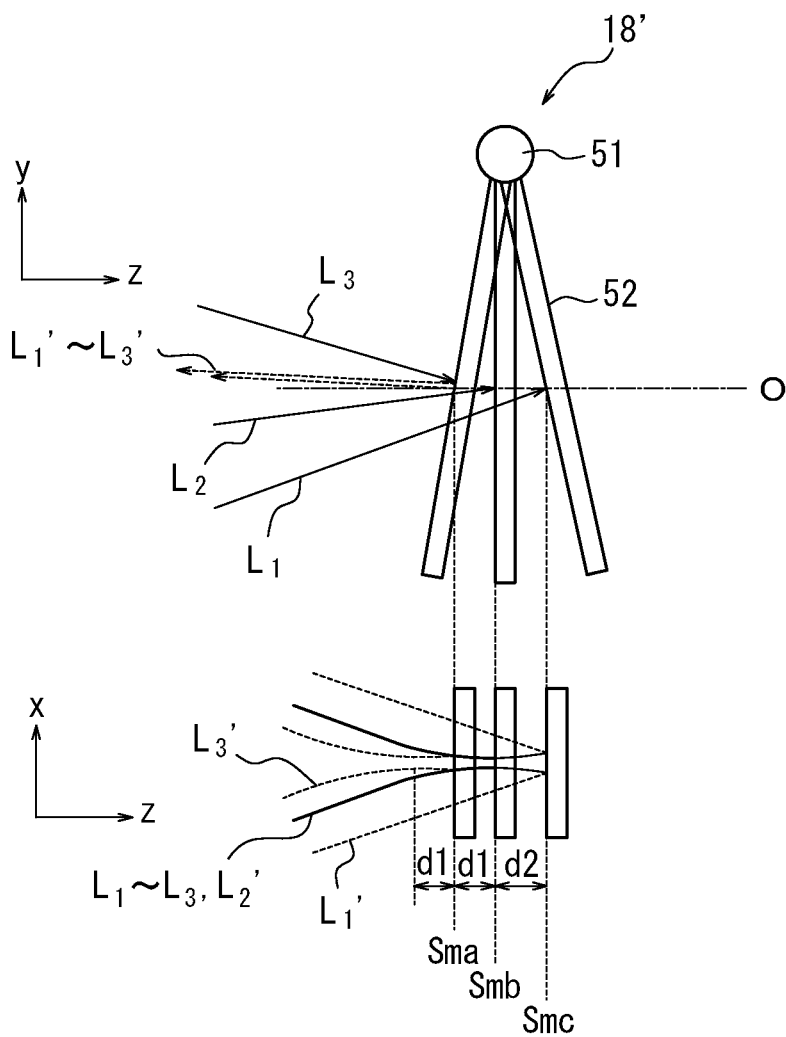
FIG. 31B is a view schematically illustrating light beams in the vicinity of the mirror element when light beams incident from the respective input/output ports are fixedly condensed at the position of the deflection element surface Smb.
Figure 31C:
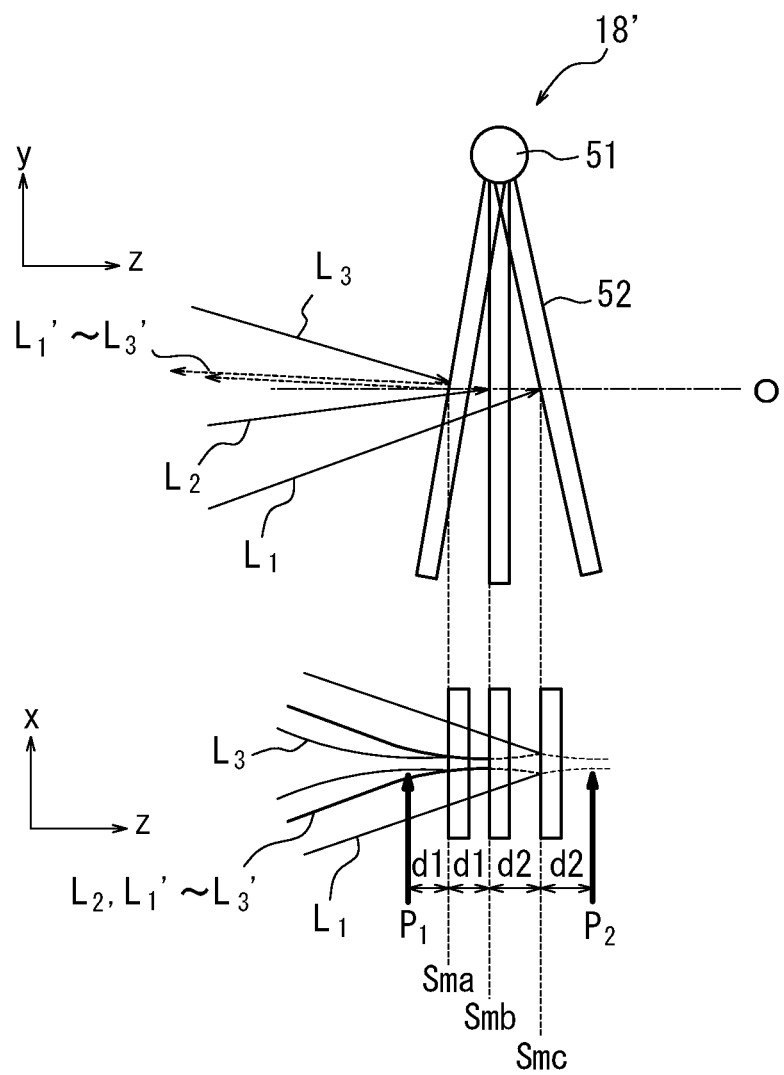
FIG. 31C is a view for illustrating the light-condensing positions of light beams from the respective input/output ports which are defined for the purpose of suppressing degradation in coupling efficiency.

The above-mentioned configuration necessitates optical consideration, which is described with reference to FIGS. 31A, 31B, and 31C. FIGS. 31A, 31B, and 31C each illustrate, on the upper section thereof, a diagram taken along the xz section, and, on the lower section thereof, a diagram taken along the yz section.

FIG. 31A is a schematic diagram illustrating displacement of the deflection element surface Sm when the micro mirror 52 serving as the deflection element 18' is turned relative to the turning axis 51. Because the turning axis 51 of the micro mirror 52 is off in the first direction (y direction) from an optical axis O of the lens 16, the deflection element surface Sm is displaced (denoted by d1 and d2 in the drawing) with deflection angle dependence in the z direction, as indicated by Sma, Smb, Smc, respectively, when the micro mirror 52 is changed to a different deflection angle so as to be combined with a different input/output port. Here, the deflection angles Sma, Smb, Smc of the micro mirror 52 each are for optically coupling the input/output ports 10a and 10d, 10b and 10d, and 10e and 10e, respectively.

FIG. 31B is a view schematically illustrating light beams in the vicinity of the deflection element 18' when light beams incident from the respective input/output ports 10a, 10b, and 10e are fixedly condensed at the position of the deflection element surface Smb. Specifically, the light beams are illustrated with no consideration given to the displacement of the deflection element surface caused by the turning of the mirror surface. In the drawing, light beams $L_1$, $L_2$, and $L_3$ are incident from the input/output ports 10a, 10b, and 10e, and in particular, the outer shapes of the light beams are schematically illustrated in the lower section of the drawing. The light beams $L_1$, $L_2$, and $L_3$ are reflected by the micro mirror 52 so as to travel toward the input/output port 10d as light beams $L_1'$, $L_2'$, and $L_3'$ When optically coupling the input/output ports 10b and 10d, the micro mirror 52 is positioned at Smb, so that the light beam $L_2$ from the input/output port 10b is reflected as the light beam $L_2'$ by the micro mirror 52. The light-condensing point on the deflection element surface Smb is arranged at a position conjugate to the incident/emitting surface of the input/output port 10d, and hence the reflected light beam $L_2'$ is coupled to the input/output port 10d with efficiency. On the other hand, when optically coupling the input/output ports 10e and 10d, the micro mirror 52 is positioned at Sma, so that the light beam $L_3$ emitted from the input/output port 10e is reflected as the light beam $L_3'$ by Sma, and condensed at a position advanced to the input/output port side from Sma by d1. This light-condensing position (Gaussian image plane) is not optically conjugate to the incident/emitting surface of the input/output port, which deteriorates coupling efficiency. The coupling efficiency is similarly deteriorated when optically coupling the input/output ports 10a and 10d.

In view of the above, according to this embodiment, the light-condensing positions of light beams from the input/output ports 10a, 10b, and 10e are defined as illustrated in FIG. 31C in order to suppress degradation in coupling efficiency. As illustrated in FIG. 31C, the light beam $L_3$ from the input/output port 10e is configured to have a light-condensing position (Gaussian image plane) at a point $P_1$ in front of the deflection element surface Sma. More specifically, a light-condensing position (corresponding to Smb) of light emitted from the input/output port 10e serving as output port and a light-condensing position $P_1$ of light incident from the input/output port 10e serving as input port are preferred to be formed at symmetrical positions with respect to the z direction. With this configuration, the light-condensing positions (Gaussian image planes) of light beams emitted from the input/output ports 10e and 10d, respectively, may be made to coincide with each other through the reflection at the deflection element 18', so as to be efficiently coupled to each other. In other words, the light beams $L_3$ from input/output port 10e is reflected by the deflection element surface Sma, while the reflected light beam $L_3'$ conforms to the light diverged after being condensed on the deflection element surface Smb, and is coupled to the input/output port 10d with efficiency.

The same applies to the case of optically coupling the input/output ports 10a and 10d to each other. Specifically, the light beam $L_1$ incident from the input/output port 10a is configured to have a light-condensing position at a position $P_2$ advanced from the deflection element surface Smc by a distance of d2. Here, the light-condensing position of light from the input/output port 10a and the light-condensing position of light from the input/output port 10e are off in opposite directions from the spatially fixed point Sm (Smb).

The light-condensing position shift compensating element 20e of this embodiment is configured as described below so as to optically function as described above.

Figure 32A:
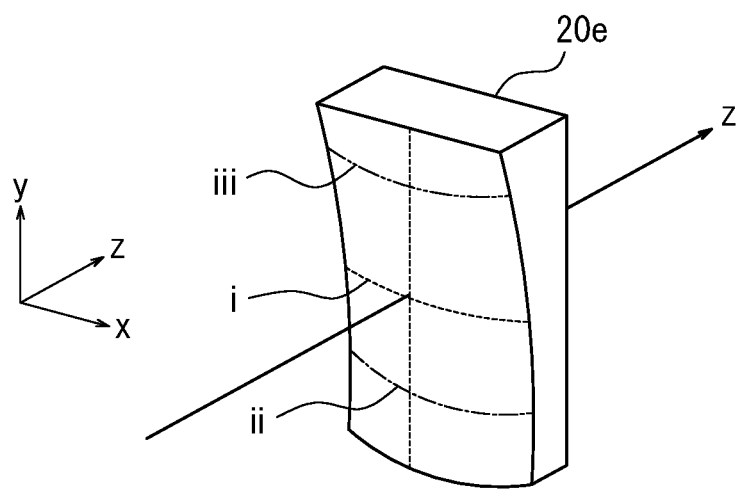
FIG. 32A is a perspective view illustrating an example of a light-condensing position shift compensating element configured in view of the displacement of the deflection element surface Sm.
Figure 32B:
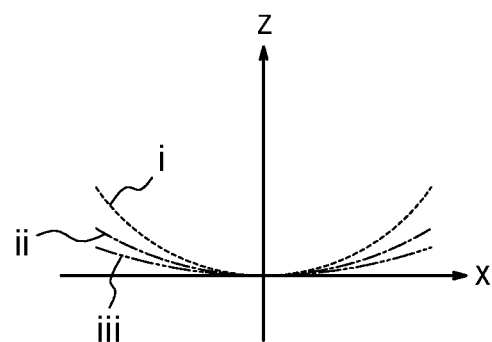
FIG. 32B is a view for illustrating a shape of the refracting interface of the light-condensing position shift compensating element of FIG. 32A.

FIG. 32A is a perspective view illustrating an example of the light-condensing position shift compensating element configured in view of the displacement of the deflection element surface Sm. FIG. 32B is a view for illustrating a shape of the refracting interface of the light-condensing position shift compensating element 20e. The light-condensing position shift compensating element 20e is formed of an optically-transparent member such as glass. In FIG. 32A, the front side is formed as a curved surface having an optical power, while the back side thereof is formed as a planar surface. The light-condensing position shift compensating element 20e has a refracting interface having sectional shapes i, ii, and iii at different positions in the y direction, which are taken along planes parallel to the xz plane. As illustrated in FIGS. 32A and 32B, the light-condensing position shift compensating element 20e has substantially no optical power in the first direction (y direction). Further, the light-condensing position shift compensating element 20e has different optical powers in the second direction (x direction) depending on the position in the first direction (y direction). More specifically, the light-condensing position shift compensating element 20e has an optical power close to zero in the second direction (x direction) in the vicinity of the end portions in a positive direction relative to the first direction (y direction) (section iii), and has a positive optical power in the second direction (x direction) which increases as the distance from the end portions in a negative direction relative to the first direction (y direction) (section i). Further, the light-condensing position shift compensating element 20e has a positive optical power in the second direction (x direction) which decreases as the distance from the center position in a negative direction relative to the first direction (y direction) (section ii). The optical power is smaller as the distance in the negative direction relative to the first direction (y direction) as compared to the optical power as the same distance in the positive direction relative to the first direction (y direction). With this configuration, the light-condensing point of a light beam passing through a position distant from the optical axis in the first direction (y direction) is asymmetrically off relative to the first direction (y direction) in the direction of the lens 14. In other words, the light-condensing position shift compensating element 20e is asymmetrically configured in the first direction (y direction). The center position in the second direction (x direction) corresponds to a position where the optical axes of the compound lens formed of the cylindrical lenses 12, 13, and the lens 14 pass through.

It should be noted that the above-mentioned shape of the light-condensing position shift compensating element 20e is merely an example, and a light-condensing position shift compensating element in another shape may also be used so as to obtain similar effects. For example, the light-condensing position shift compensating element may be formed in a shape having zero optical power in the second direction (x direction) at the center position in the first direction (y direction), while having a negative optical power in the second direction (x direction) that increases as the distance from the center position to the positive and negative directions relative to the first direction (y direction), the optical power at a distance in the negative direction being smaller than the optical power at a distance in the positive direction. In this case, the curvature radii of the cylindrical lenses 12 and 13 need to be changed according to the shape of the light-condensing position shift compensating element 20e.

Further, the actual surface shape is determined depending on the amount of shift in the z direction of the mirror at the time of turning which depends on the deflection angle of the micro mirror and the distance from the turning center to the light-condensing plane, and also depending on the aberration property of the downstream optical system including the lens 14, the dispersive element 15, and the lens 16. For this reason, the light-condensing position shift compensating element 20e has an optical power that may be any of a monotonically decreasing function, a monotonically increasing, and a function having one or more inflection points.

Figure 33A:
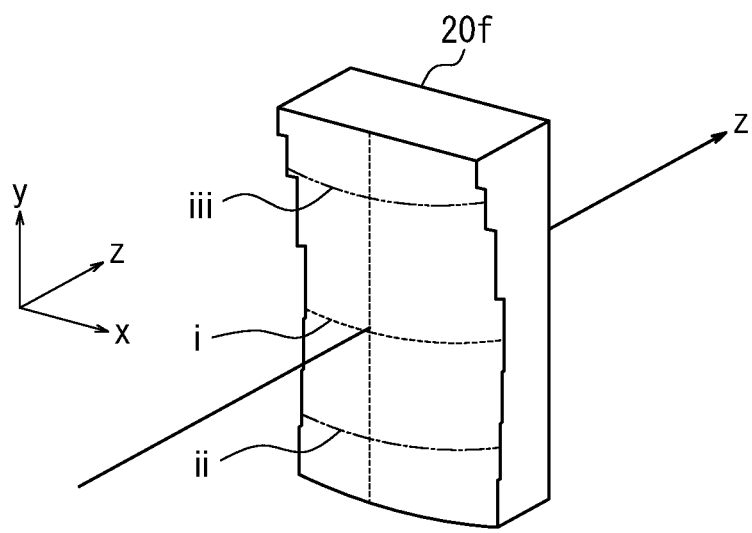
FIG. 33A is a perspective view of a modified example of the light-condensing position shift compensating element of the eleventh embodiment.
Figure 33B:
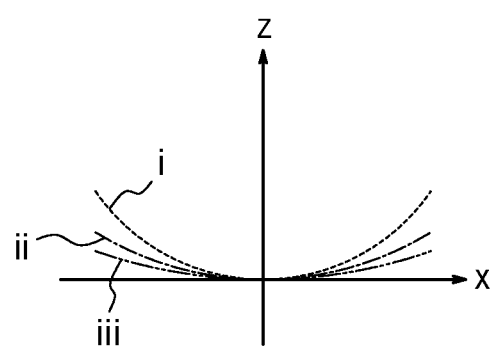
FIG. 33B is a view for illustrating a shape of the refracting interface of the light-condensing position shift compensating element of FIG. 33A.

Further, light beams from the input/output ports 10a to 10e substantially do not overlap each other with respect to each port on the surface of the light-condensing position shift compensating element 20e. Therefore, a light-condensing position shift compensating element 20f according to a modified example of this embodiment as illustrated in FIGS. 33A and 33B may be used in place of the light-condensing position shift compensating element 20e. The light-condensing position shift compensating element 20e has a refracting interface formed of a curved surface having a smoothly-changing curvature, whereas the light-condensing position shift compensating element 20f has a refracting interface formed of a combination of parts of cylindrical surfaces that are different in curvature in the second direction (x direction), in accordance with the incident positions of input light from the respective input/output ports 10a to 10c and 10e in the first direction (y direction). Here, the respective cylindrical surfaces are arranged in such a manner that the refracting interfaces in the yz plane including the z axis draw a straight line. In other portions, there are differences in level among the respective cylindrical refracting interfaces corresponding to the input/output ports 10a to 10e that are different from one another.

With the use of the light-condensing position shift compensating element 20f configured as described above, input light beams of light input from the respective input/output ports 10*a* to 10*c* and 10*e* are all subjected to uniform optical power in the second direction (x direction). Further, the refracting interface in the yz plane including the z axis may not draw a straight line. For example, concentric cylinders may be stacked to form the cylindrical refracting interfaces corresponding to the input/output ports 10*a* to 10*e* that are different from each other. Even in this case, input light beams of light input from the respective input/output ports 10*a* to 10*c* and 10*e* are all subjected to uniform optical power in the second direction (x direction).

As described above, according to the wavelength selective switch of this embodiment, even when the element surface Sm of the deflection element is displaced according to the combination of the selected ones of the input/output ports 10*a* to 10*e*, wavelength-demultiplexed lights dispersed by the dispersive element 15 can be condensed with high accuracy at a position conjugate to the emitting surface of the input/output port 10*d* serving as the output port, regardless of the positions of the input/output ports 10*a* to 10*c* and 10*e* from which the light has been input. Further, the light-condensing position shift compensating elements 20*e* and 20*f* are each configured to have an asymmetric optical power relative to the optical axis in the first direction (y direction), so that the light-condensing position can be optimally adjusted with increased degree of freedom with respect to a deflection element formed of a micro mirror 1 having the turning center distant from the center of the reflecting surface.

According to this embodiment, the light-condensing position shift compensating element 20 disposed close to the input/output ports 10*a* to 10*e* in the first embodiment is replaced by the light-condensing position shift compensating element 20*e*. Further, even in the other embodiments described above, when the deflection element 18 is a mirror having a turning axis off in position from the light-condensing position, the light-condensing position shift compensating element may be configured asymmetric so that the light-condensing position of light from an input port is made conjugate to the position of an output port, to thereby obtain the similar effect.

For example, the dispersive element 18', which has an axisymmetric grating in the yd direction in the ninth embodiment, may have an asymmetric grating. Specifically, the regions a, b, and c may all be configured to have different grating characteristics. The dispersive element may be changed in pitch so as to have different optical powers, and the grating may be formed discontinuous in the first direction (yd direction), so that the dispersive element has a dispersing function and a light-condensing position shift compensating function, to thereby allow light dispersed into wavelength by the dispersive element to be condensed with high accuracy at a position optically conjugate to the incident/emitting surface of the input/output port 10*d*, regardless of the positions of the input/output ports 10*a* to 10*c* and 10*e* from which the light has been input.

The present invention is not limited only to the above-mentioned embodiments, and may be subjected to various modifications and alterations. For example, the input port and the output port may be configured to include a plurality of common input/output ports, so that the ports can be switched between the input port and the output port as appropriate. Further, the input port and the output port, which have end surfaces arranged in series in the embodiments, may be separately arranged at different positions.

In the embodiments, the light-condensing position shift compensating element of the present invention is configured to compensate input light so as to form a spot that has a smallest width in the second direction (x direction) on the deflection element surface. However, even if the width in the second direction (x direction) does not take a minimum value, the present invention can still provide an effect of improving communication quality as long as the spot has a smaller width in the second direction (x direction) as compared to the case of not including the light-condensing position shift compensating element. Therefore, the case where the spot does not take a minimum value in the second direction (x direction) still falls within the scope of the present invention as long as the above-mentioned effect can be obtained.

Further, in the embodiments, a vertical direction perpendicular to the optical axis direction (z direction) of input light output from the input/output port is defined as the first direction (y direction), and the horizontal direction is defined as the second direction (x direction). However, the first direction (y direction) is not limited to the vertical direction, and the second direction (x direction) is not limited to the horizontal direction. The first direction (y direction) and the second direction (x direction) may be any directions that are perpendicular to the traveling direction of input light and also perpendicular to each other.

Further, the beam shaping optical system is not limited to the combination of a cylindrical lens having an optical power in the first direction (y direction) and a cylindrical lens having an optical power in the second direction (x direction) perpendicular to the first direction (y direction). For example, a single spherical lens may be employed if a circular beam spot is allowable. Alternatively, in place of the cylindrical lens having an optical power in the first direction (y direction), another lens having an optical power at least in the first direction (y direction), for example, a spherical lens may be used, and a cylindrical lens may be disposed downstream thereof. Even in such a case, a beam waist in an elliptic shape may be formed at the light-condensing position. Further, as a lens having an optical power in one direction, a Fresnel lens (linear Fresnel lens) having an optical power in one direction may also be employed in place of the cylindrical lens.

The shapes of the light-condensing position shift compensating element exemplified in the embodiments are illustrated merely as examples. For example, the light-condensing position shift compensating element disposed in the beam shaping optical system is not limited to the one that has a refracting interface formed on the input portion side, and may be configured to have a refracting interface formed on a surface on the dispersive element side or on both surfaces. Further, the deflection portion is not limited to the MEMS mirror array, and may be configured by using a liquid crystal element and optical crystal. The lens 14 may have a function similar to that of the light-condensing position shift compensating element 20. In this case, a surface having a compensating function may or may not have an optical power in the first direction (y direction). The lens 14 and the lens 16 may be any lens as long as capable of producing a light condensing effect, and may employ a condenser mirror, a diffraction-type condenser element, and the like. The dispersive element is not limited to the transmissive type, and may employ a reflective diffraction grating, a Grism, a super prism, and the like. In each of the above-mentioned embodiments, a single member functions as the light-condensing position shift compensating element. However, a plurality of members may function as the light-condensing position shift compensating element. In this case, the members may be selected so as to cancel out variation in compensation power as the light-condensing position shift compensating element resulting from the production tolerance of the members, which makes it possible to substantially improve the production yields of the members.

DESCRIPTION OF SYMBOLS 1 wavelength selective switch
10 input/output portion
10a to 10e input/output port
11 micro lens array
12 cylindrical lens
12' spherical mirror
13 cylindrical lens (anamorphic lens)
14 lens
15 dispersive element (diffraction grating)
15' dispersive element (diffraction grating having a function of compensating light-condensing position shift)
16 lens (condenser lens)
17 deflector
18, 18' deflection element (mirror)
20, 20a to 20f light-condensing position shift compensating element
20' light-condensing position shift compensating element (reflective type)
21 light-condensing position shift compensating element
25 beam shaping optical system
31 condenser lens
32 dispersive element
32' dispersive element (diffraction grating having a function of compensating light-condensing position shift)
33 mirror
33a reflecting surface
41 light-condensing position shift compensating element
51 turning axis
52 micro mirror
$Y_1, Y_2$ distance from the optical axis
Sf primary light-condensing plane
Sd dummy plane
Sm deflection element surface

The invention claimed is:

1. A wavelength selective switch, comprising:
   at least one input port;
   a dispersive portion for dispersing wavelength-multiplexed light input from the input port into wavelength-demultiplexed lights;
   a condenser element for condensing the wavelength-demultiplexed lights dispersed by the dispersive portion;
   a deflection portion having deflection elements for deflecting, for each wavelength-demultiplexed light condensed by the condenser element;
   at least one output port for outputting the wavelength-demultiplexed lights deflected by the deflection portion; and
   a light-condensing position shift compensating element which is disposed in an optical path between the input port and the dispersive portion or in the dispersive portion, and compensates light-condensing position shift of the wavelength-demultiplexed lights in the traveling direction of the input light relative to the deflection element, light-condensing position shift being generated based on the arrangement of the input ports.

2. The wavelength selective switch according to claim 1, wherein the input ports and the output ports are arranged in a first direction,
   wherein the light-condensing position shift compensating element has an optical power in a second direction which is perpendicular to a traveling direction of the input light and also perpendicular to the first direction, and
   wherein the optical power in the second direction varies depending on the position in the first direction.

3. The wavelength selective switch according to claim 2, further comprising a beam shaping optical system for shaping the input light input from the input port so that the wavelength-demultiplexed lights condensed on the deflection elements each form an elliptical spot,
   wherein the light-condensing position shift compensating element is disposed in the beam shaping optical system.

4. The wavelength selective switch according to claim 3, wherein the beam shaping optical system includes, along the traveling direction of the input light, the light-condensing position shift compensating element, a first optical member having an optical power at least in the first direction, and a second optical member having an optical power only in the second direction.

5. The wavelength selective switch according to claim 3, wherein the beam shaping optical system includes, along the traveling direction of the input light, a first optical member having an optical power at least in the first direction, and the light-condensing position shift compensating element.

6. The wavelength selective switch according to claim 1,
   wherein the dispersive portion includes a dispersive element for dispersing the input light into wavelength-demultiplexed lights, and a reflective element for reflecting the wavelength-demultiplexed lights by the dispersive element so that the wavelength-demultiplexed lights are incident again on the dispersive element,
   wherein the light-condensing position shift compensating element is integrally formed with the reflective element.

7. The wavelength selective switch according to claim 1, further comprising a beam shaping optical system for shaping the input light input from the input port so that the wavelength-demultiplexed lights condensed on the deflection elements each form an elliptical spot,
   wherein the light-condensing position shift compensating element is disposed in the beam shaping optical system.

8. The wavelength selective switch according to claim 7,
   wherein the input ports and the output ports are arranged in a first direction,
   wherein the light-condensing position shift compensating element has an optical power in second direction which is perpendicular to a traveling direction of the input light and also perpendicular to the first direction, and the section of the optical surface perpendicular to the second direction is shifted in the traveling direction of the input light according to the position in the first direction.

9. The wavelength selective switch according to claim 1, wherein the light-condensing position shift compensating element has no optical power, and has air equivalent lengths, along which the input light passes through the light-condensing position shift compensating element, that are set to different lengths so as to compensate the light-condensing position shift.

10. The wavelength selective switch according to claim 9,
    wherein the input ports and the output ports are arranged in the first direction,
    wherein the light-condensing position shift compensating element is formed of a member that has steps so as to be changed in thickness in the traveling direction of the input light relative to the position in the first direction, according to each of the input ports.

11. The wavelength selective switch according to claim 9, further comprising a micro lens which is disposed on a surface on the input port side of the light-condensing position shift compensating element and collimates the input light from each input port,
    wherein a curvature radius of the micro lens and a distance between the input ports and the micro lens are set, together with the air equivalent lengths of the light-condensing position shift compensating element, so as to compensate the light-condensing position shift.

12. The wavelength selective switch according to claim 1, further comprising a beam shaping optical system for shaping the input light input from the input port so that the wavelength-demultiplexed lights condensed on the deflection element forms an elliptical spot.

13. The wavelength selective switch according to claim 1, wherein the input ports and the output ports are arranged in the first direction, wherein the dispersive portion is integrally formed with the light-condensing position shift compensating element so as to disperse input light into wavelength-demultiplexed lights in a second direction which is perpendicular to the traveling direction of the input light and also perpendicular to the first direction, and has an optical power in the second direction, the optical power being different depending on the position in the first direction.

14. The wavelength selective switch according to claim 13, wherein the dispersive portion includes a diffraction grating, wherein the diffraction grating is sectioned into a plurality of regions in the first direction, wherein each region of the diffraction grating has a grating pitch, and they are discontinuous across a boundary between adjacent regions of the plurality of regions, wherein the diffraction grating has a grating pitch which changes along the second direction in at least one of the regions.

15. The wavelength selective switch according claim 1, wherein the input ports and the output ports are arranged in the first direction, wherein the deflection elements are mirrors, and each of the mirrors has a turning axis off from the light-condensing position of the wavelength-demultiplexed lights, wherein the light-condensing position shift compensating element is asymmetrically configured in the first direction and compensates the light-condensing position of the wavelength-demultiplexed lights from each input port, in accordance with the deflection angle of the deflection element that varies depending on a combination of the input port and the output port, so as to make the light-condensing position conjugate to the position of the output port.

* * * * *